(12) United States Patent
Devos et al.

(10) Patent No.: US 10,293,512 B2
(45) Date of Patent: May 21, 2019

(54) DRAWER, DRAWER CONSTRUCTION AND METHOD FOR MANUFACTURING A DRAWER

(75) Inventors: Pieter Devos, Koolskamp (BE); Benny Schacht, Vlamertinge (BE); Guy Van Hooydonck, Schoten (BE)

(73) Assignee: UNILIN BVBA, Wielsbeke (BE)

( * ) Notice: Subject to any disclaimer, the term of this patent is extended or adjusted under 35 U.S.C. 154(b) by 0 days.

(21) Appl. No.: 14/128,102

(22) PCT Filed: Jun. 25, 2012

(86) PCT No.: PCT/IB2012/053206
§ 371 (c)(1),
(2), (4) Date: Dec. 20, 2013

(87) PCT Pub. No.: WO2013/001442
PCT Pub. Date: Jan. 3, 2013

(65) Prior Publication Data
US 2014/0111076 A1    Apr. 24, 2014

Related U.S. Application Data

(60) Provisional application No. 61/503,814, filed on Jul. 1, 2011.

(30) Foreign Application Priority Data

Jun. 29, 2011  (BE) .................................. 2011/0404
Jul. 13, 2011  (BE) .................................. 2011/0448
Oct. 25, 2011  (BE) .................................. 2011/0623

(51) Int. Cl.
*B27F 1/02*    (2006.01)
*F16B 12/12*   (2006.01)
(Continued)

(52) U.S. Cl.
CPC ................ *B27F 1/02* (2013.01); *A47B 88/00* (2013.01); *A47B 88/941* (2017.01); *B27F 1/08* (2013.01);
(Continued)

(58) Field of Classification Search
CPC ............. A47B 88/0014; A47B 88/941; B27M 3/0066; B27F 1/08; B27F 4/00; B27F 1/02
(Continued)

(56) References Cited

U.S. PATENT DOCUMENTS 242,026 A    5/1881    O'Connor
316,176 A    4/1885    Ransom
(Continued)

FOREIGN PATENT DOCUMENTS

BE    465 593 A    5/1946
BE    740 678 A    4/1970
(Continued)

OTHER PUBLICATIONS

BE Search Report for corresponding BE Application No. 2011/0404, dated Dec. 23, 2011.
(Continued)

*Primary Examiner* — Daniel J Troy
*Assistant Examiner* — Timothy M Ayres
(74) *Attorney, Agent, or Firm* — Workman Nydegger

(57) ABSTRACT

A method for manufacturing drawers in which the drawers comprise walls, and a bottom. At least first and second walls comprise a tongue and a groove with locking parts. The respective groove is provided on the interior side of the first wall, whereas the respective tongue is provided on the distal end of the second wall. The first and second walls are manufactured of respectively one board.

6 Claims, 9 Drawing Sheets

(51) Int. Cl.
  *B27F 1/08* (2006.01)
  *B27M 1/08* (2006.01)
  *B27M 3/18* (2006.01)
  *A47B 88/00* (2017.01)
  *B27M 3/00* (2006.01)
  *A47B 88/90* (2017.01)
  *A47B 47/04* (2006.01)
  *F16B 12/46* (2006.01)
  *A47B 88/427* (2017.01)

(52) U.S. Cl.
  CPC ............ *B27M 1/08* (2013.01); *B27M 3/0066* (2013.01); *B27M 3/18* (2013.01); *F16B 12/125* (2013.01); *A47B 47/042* (2013.01); *A47B 88/427* (2017.01); *F16B 12/46* (2013.01)

(58) Field of Classification Search
  USPC .... 312/348.1, 257.1, 348.4; 144/6.5, 7, 347, 144/24.04, 37, 354, 359, 360, 367, 368, 144/369, 371
  See application file for complete search history.

(56) References Cited

U.S. PATENT DOCUMENTS

| | | | |
|---|---|---|---|
| 325,049 A | 8/1885 | Brolaski | |
| 372,694 A | 11/1887 | Mergott | |
| 443,271 A | 12/1890 | Dumas | |
| 517,348 A * | 3/1894 | Linderman | 144/354 |
| 634,581 A | 10/1899 | Miller | |
| 637,212 A | 11/1899 | McCune | |
| 653,514 A | 7/1900 | Kasschau | |
| 786,940 A | 4/1905 | Amsden | |
| 861,911 A | 7/1907 | Stewart | |
| 873,496 A | 12/1907 | Bryant | |
| 881,673 A | 3/1908 | Ellison | |
| 1,032,674 A | 7/1912 | Holland | |
| 1,070,572 A | 8/1913 | Wyckoff | |
| 1,159,229 A | 11/1915 | Keith | |
| 1,194,636 A | 8/1916 | Joy | |
| 1,436,858 A | 11/1922 | Burhen | |
| 1,468,786 A * | 9/1923 | Knechtel | 403/381 |
| 1,533,099 A | 4/1925 | Carroll | |
| 1,534,468 A | 4/1925 | Shea, Jr. | |
| 1,743,492 A | 1/1930 | Sipe | |
| 1,922,994 A | 8/1933 | Voigt | |
| 1,954,242 A * | 4/1934 | Heppenstall | A47B 47/042 312/263 |
| 2,002,228 A | 5/1935 | Meyercord et al. | |
| 2,065,133 A | 12/1936 | Heppenstall | |
| 2,116,584 A | 5/1938 | Shelby | |
| 2,362,904 A | 11/1944 | Kramer | |
| 2,453,918 A | 11/1948 | Jansen | |
| 2,496,184 A | 1/1950 | Von Canon | |
| 2,551,775 A * | 5/1951 | Von Canon | B65D 9/32 217/12 R |
| 2,607,375 A * | 8/1952 | Gillespie et al. | 144/87 |
| 2,681,483 A | 6/1954 | Morawetz | |
| 2,732,706 A | 1/1956 | Friedman | |
| 2,801,895 A * | 8/1957 | Gass | 312/257.1 |
| 2,863,185 A | 12/1958 | Riedi | |
| 2,872,712 A | 2/1959 | Brown et al. | |
| 2,981,669 A | 4/1961 | Brand et al. | |
| 3,021,187 A | 2/1962 | Mitchell | |
| 3,078,888 A | 2/1963 | Bruemmer | |
| 3,090,086 A | 5/1963 | Fata | |
| 3,195,968 A | 7/1965 | Freeman | |
| 3,284,152 A | 11/1966 | Schorghuber | |
| 3,325,585 A | 6/1967 | Brenneman | |
| 3,347,610 A | 10/1967 | Pilliod | |
| 3,378,958 A | 4/1968 | Parks et al. | |
| 3,410,441 A | 11/1968 | Rhyne | |
| 3,526,071 A | 9/1970 | Watanabe | |
| 3,539,425 A * | 11/1970 | Marburg | 156/247 |
| 3,547,171 A | 12/1970 | Jacumin | |
| 3,664,011 A | 5/1972 | Labastrou | |
| 3,722,971 A | 3/1973 | Zeischegg | |
| 3,745,736 A | 7/1973 | Fischer et al. | |
| 3,760,547 A | 9/1973 | Brenneman | |
| 3,885,845 A | 5/1975 | Krieks | |
| 3,902,291 A | 9/1975 | Zucht | |
| 3,933,401 A * | 1/1976 | Lampe et al. | 312/348.1 |
| 3,950,915 A | 4/1976 | Cole | |
| 4,012,090 A | 3/1977 | Pfeifer et al. | |
| 4,012,155 A | 3/1977 | Morris | |
| 4,019,298 A | 4/1977 | Johnson, IV | |
| 4,025,216 A | 5/1977 | Hives | |
| 4,037,380 A | 7/1977 | Pollock | |
| 4,047,777 A | 9/1977 | Pfeifer et al. | |
| 4,089,614 A | 5/1978 | Harley | |
| 4,099,887 A | 7/1978 | Mackenroth | |
| 4,110,946 A | 9/1978 | Louther, Jr. | |
| 4,112,986 A | 9/1978 | Strange et al. | |
| 4,116,513 A | 9/1978 | Ullman, Jr. | |
| RE30,154 E | 11/1979 | Jarvis | |
| 4,195,462 A | 4/1980 | Keller et al. | |
| 4,206,956 A | 6/1980 | Lydmar | |
| 4,279,455 A | 7/1981 | Santo | |
| 4,391,008 A | 7/1983 | Yamaoka et al. | |
| 4,416,097 A | 11/1983 | Weir | |
| 4,422,488 A | 12/1983 | Lacroix et al. | |
| 4,462,647 A | 7/1984 | Key | |
| 4,466,675 A | 8/1984 | Ferdinand et al. | |
| 4,471,822 A | 9/1984 | Griganavicius | |
| 4,514,104 A | 4/1985 | Taylor et al. | |
| 4,640,437 A | 2/1987 | Weingartner | |
| 4,651,651 A | 3/1987 | Sheffer | |
| 4,750,794 A | 6/1988 | Vegh | |
| 4,758,056 A | 7/1988 | Buck et al. | |
| 4,800,821 A | 1/1989 | Nook et al. | |
| 4,832,421 A | 5/1989 | Shoffner | |
| 4,884,854 A | 12/1989 | Joffe | |
| 4,886,326 A | 12/1989 | Kuzyk | |
| 4,888,933 A | 12/1989 | Guomundsson et al. | |
| 4,909,581 A | 3/1990 | Haheeb | |
| 4,966,421 A | 10/1990 | Mengel | |
| 4,984,929 A | 1/1991 | Rock et al. | |
| 4,996,817 A | 3/1991 | Nelson | |
| 5,148,850 A | 9/1992 | Urbanick | |
| 5,247,773 A | 9/1993 | Weir | |
| 5,267,425 A | 12/1993 | Onysko et al. | |
| 5,295,341 A | 3/1994 | Kajiwara | |
| 5,323,584 A | 6/1994 | Scarlett | |
| 5,348,778 A | 9/1994 | Knipp et al. | |
| 5,368,380 A | 11/1994 | Mottmiller et al. | |
| 5,454,331 A | 10/1995 | Green | |
| 5,475,960 A | 12/1995 | Lindal | |
| 5,499,886 A | 3/1996 | Short et al. | |
| 5,527,103 A | 6/1996 | Pittman | |
| 5,548,937 A | 8/1996 | Shimonohara | |
| 5,555,980 A | 9/1996 | Johnston et al. | |
| 5,597,221 A | 1/1997 | Grieser et al. | |
| 5,605,389 A | 2/1997 | Kelly et al. | |
| 5,611,637 A | 3/1997 | Brustle et al. | |
| 5,647,181 A | 7/1997 | Hunts | |
| 5,658,086 A | 8/1997 | Brokaw et al. | |
| 5,662,399 A | 9/1997 | Henkel et al. | |
| 5,803,561 A | 9/1998 | Puehlhorn | |
| 5,893,617 A | 4/1999 | Lee | |
| 5,899,251 A | 5/1999 | Turner | |
| 5,911,180 A | 6/1999 | Mullens | |
| 5,970,675 A | 10/1999 | Schray | |
| 6,006,486 A | 12/1999 | Moriau et al. | |
| 6,045,290 A | 4/2000 | Nocievski | |
| 6,086,995 A | 7/2000 | Smith | |
| 6,309,039 B1 * | 10/2001 | Park | A47B 96/202 229/931 |
| 6,357,194 B1 | 3/2002 | Jones, Jr. | |
| 6,413,007 B1 * | 7/2002 | Lambright | 403/353 |
| 6,490,836 B1 | 12/2002 | Moriau et al. | |
| 6,502,002 B2 | 12/2002 | Susnjara et al. | |
| 6,553,724 B1 | 4/2003 | Bigler | |
| 6,820,950 B1 | 11/2004 | Sun | |

(56) References Cited

U.S. PATENT DOCUMENTS

| | | |
|---|---|---|
| 6,827,028 B1 | 12/2004 | Callaway |
| 6,874,291 B1 | 4/2005 | Weber |
| 6,874,292 B2 | 4/2005 | Moriau et al. |
| 6,928,779 B2 | 8/2005 | Moriau et al. |
| 6,955,020 B2 | 10/2005 | Moriau et al. |
| 6,993,877 B2 | 2/2006 | Moriau et al. |
| 7,021,019 B2 | 4/2006 | Knauseder |
| 7,040,068 B2 | 5/2006 | Moriau et al. |
| 7,152,383 B1 | 12/2006 | Wilkinson, Jr. et al. |
| 7,255,236 B1 | 8/2007 | Sauder et al. |
| 7,328,536 B2 | 2/2008 | Moriau et al. |
| 7,451,535 B2 | 11/2008 | Wells et al. |
| 7,467,499 B2 | 12/2008 | Moriau et al. |
| 7,484,337 B2 | 2/2009 | Hecht |
| 7,617,645 B2 | 11/2009 | Moriau et al. |
| 7,621,094 B2 | 11/2009 | Moriau et al. |
| 7,634,884 B2 | 12/2009 | Pervan et al. |
| 7,634,886 B2 | 12/2009 | Moriau et al. |
| 7,634,887 B2 | 12/2009 | Moriau et al. |
| 7,637,066 B2 | 12/2009 | Moriau et al. |
| 7,637,067 B2 | 12/2009 | Moriau et al. |
| 7,640,708 B2 | 1/2010 | Moriau et al. |
| 7,641,414 B1 | 1/2010 | Joyce |
| 7,644,554 B2 | 1/2010 | Moriau et al. |
| 7,644,555 B2 | 1/2010 | Moriau et al. |
| 7,644,557 B2 | 1/2010 | Moriau et al. |
| 7,647,741 B2 | 1/2010 | Moriau et al. |
| 7,647,743 B2 | 1/2010 | Moriau et al. |
| 7,650,727 B2 | 1/2010 | Moriau et al. |
| 7,650,728 B2 | 1/2010 | Moriau et al. |
| 7,654,054 B2 | 2/2010 | Moriau et al. |
| 7,654,055 B2 | 2/2010 | Ricker |
| 7,658,048 B2 | 2/2010 | Moriau et al. |
| 7,661,238 B2 | 2/2010 | Moriau et al. |
| 7,665,265 B2 | 2/2010 | Moriau et al. |
| 7,665,266 B2 | 2/2010 | Moriau et al. |
| 7,665,267 B2 | 2/2010 | Moriau et al. |
| 7,665,268 B2 | 2/2010 | Moriau et al. |
| 7,669,376 B2 | 3/2010 | Moriau et al. |
| 7,669,377 B2 | 3/2010 | Moriau et al. |
| 7,673,431 B2 | 3/2010 | Moriau et al. |
| 7,677,008 B2 | 3/2010 | Moriau et al. |
| 7,681,371 B2 | 3/2010 | Moriau et al. |
| 7,698,868 B2 | 4/2010 | Moriau et al. |
| 7,698,869 B2 | 4/2010 | Moriau et al. |
| 7,707,793 B2 | 5/2010 | Moriau et al. |
| 7,712,280 B2 | 5/2010 | Moriau et al. |
| 7,726,088 B2 | 6/2010 | Muehlebach |
| 7,726,089 B2 | 6/2010 | Moriau et al. |
| 7,735,288 B2 | 6/2010 | Moriau et al. |
| 7,757,453 B2 | 7/2010 | Moriau et al. |
| 7,770,350 B2 | 8/2010 | Moriau et al. |
| 7,810,297 B2 | 10/2010 | Moriau et al. |
| 7,827,754 B2 | 11/2010 | Moriau et al. |
| 7,827,755 B2 | 11/2010 | Moriau et al. |
| 7,841,145 B2 | 11/2010 | Pervan et al. |
| 7,866,110 B2 | 1/2011 | Pervan |
| 7,950,755 B2 | 5/2011 | Vardon |
| 7,980,039 B2 | 7/2011 | Groeke et al. |
| 7,997,044 B2 | 8/2011 | Green et al. |
| 8,001,910 B2 | 8/2011 | Yee et al. |
| 8,042,311 B2 | 10/2011 | Pervan et al. |
| 8,079,196 B2 | 12/2011 | Pervan |
| 8,092,112 B2 | 1/2012 | Borgman et al. |
| 8,166,723 B2 | 5/2012 | Moriau et al. |
| 8,206,054 B1 | 6/2012 | Burnett et al. |
| 8,220,217 B2 | 7/2012 | Muehlebach |
| 8,231,301 B1 | 7/2012 | Joyce |
| 8,302,361 B2 | 11/2012 | Braun et al. |
| 8,365,494 B2 | 2/2013 | Moriau et al. |
| 8,381,476 B2 | 2/2013 | Hannig |
| 8,387,327 B2 | 3/2013 | Pervan |
| 8,398,905 B2 | 3/2013 | Nilsson |
| 8,511,040 B2 | 8/2013 | Braun et al. |
| 8,621,814 B2 | 1/2014 | Cappelle |
| 8,622,489 B2 | 1/2014 | Crabtree, II |
| 8,641,155 B2 | 2/2014 | Lee |
| 8,707,650 B2 | 4/2014 | Pervan et al. |
| 8,726,511 B2 * | 5/2014 | Schulte .............. B27F 1/02 29/897.32 |
| 8,757,917 B2 | 6/2014 | Andersson |
| 8,966,853 B2 | 3/2015 | Hannig |
| 2002/0093272 A1 | 7/2002 | Saravis |
| 2003/0024200 A1 | 2/2003 | Moriau et al. |
| 2003/0029115 A1 | 2/2003 | Moriau et al. |
| 2003/0029116 A1 | 2/2003 | Moriau et al. |
| 2003/0029117 A1 | 2/2003 | Moriau et al. |
| 2003/0224201 A1 | 2/2003 | Moriau et al. |
| 2003/0066813 A1 | 4/2003 | Taylor |
| 2003/0155847 A1 | 8/2003 | Henkel |
| 2004/0049999 A1 | 3/2004 | Krieger |
| 2004/0090156 A1 | 5/2004 | Kunanantakul |
| 2004/0128934 A1 | 7/2004 | Hecht |
| 2004/0222722 A1 | 11/2004 | Yang |
| 2004/0253051 A1 | 12/2004 | Napp |
| 2005/0225216 A1 | 10/2005 | Kim |
| 2005/0284075 A1 | 12/2005 | Moriau et al. |
| 2005/0284076 A1 | 12/2005 | Moriau et al. |
| 2006/0005499 A1 | 1/2006 | Moriau et al. |
| 2006/0032177 A1 | 2/2006 | Moriau et al. |
| 2006/0101769 A1 | 5/2006 | Pervan et al. |
| 2006/0196138 A1 | 9/2006 | Moriau et al. |
| 2006/0201095 A1 | 9/2006 | Moriau et al. |
| 2006/0225370 A1 | 10/2006 | Moriau et al. |
| 2006/0225377 A1 | 10/2006 | Moriau et al. |
| 2006/0236630 A1 | 10/2006 | Moriau et al. |
| 2006/0236631 A1 | 10/2006 | Moriau et al. |
| 2006/0236632 A1 | 10/2006 | Moriau et al. |
| 2006/0236633 A1 | 10/2006 | Moriau et al. |
| 2006/0236634 A1 | 10/2006 | Moriau et al. |
| 2006/0236635 A1 | 10/2006 | Moriau et al. |
| 2006/0236636 A1 | 10/2006 | Moriau et al. |
| 2006/0236637 A1 | 10/2006 | Moriau et al. |
| 2006/0236638 A1 | 10/2006 | Moriau et al. |
| 2006/0236643 A1 | 10/2006 | Moriau et al. |
| 2006/0248829 A1 | 11/2006 | Moriau et al. |
| 2006/0248830 A1 | 11/2006 | Moriau et al. |
| 2006/0248831 A1 | 11/2006 | Moriau et al. |
| 2006/0254183 A1 | 11/2006 | Moriau et al. |
| 2006/0254184 A1 | 11/2006 | Moriau et al. |
| 2006/0254185 A1 | 11/2006 | Moriau et al. |
| 2006/0260249 A1 | 11/2006 | Moriau et al. |
| 2006/0272263 A1 | 12/2006 | Moriau et al. |
| 2007/0006543 A1 | 1/2007 | Engstrom |
| 2007/0028547 A1 | 2/2007 | Grafenauer et al. |
| 2007/0094986 A1 | 5/2007 | Moriau et al. |
| 2007/0094987 A1 | 5/2007 | Moriau et al. |
| 2007/0107360 A1 | 5/2007 | Moriau et al. |
| 2007/0107363 A1 | 5/2007 | Moriau et al. |
| 2007/0134613 A1 | 6/2007 | Kuo et al. |
| 2007/0251188 A1 | 11/2007 | Moriau et al. |
| 2008/0010928 A1 | 1/2008 | Moriau et al. |
| 2008/0010929 A1 | 1/2008 | Moriau et al. |
| 2008/0034708 A1 | 2/2008 | Pervan |
| 2008/0053027 A1 | 3/2008 | Moriau et al. |
| 2008/0053028 A1 | 3/2008 | Moriau et al. |
| 2008/0053029 A1 | 3/2008 | Ricker |
| 2008/0053207 A1 | 3/2008 | Moriau et al. |
| 2008/0060309 A1 | 3/2008 | Moriau et al. |
| 2008/0060310 A1 | 3/2008 | Moriau et al. |
| 2008/0060311 A1 | 3/2008 | Moriau et al. |
| 2008/0066415 A1 | 3/2008 | Pervan et al. |
| 2008/0066416 A1 | 3/2008 | Moriau et al. |
| 2008/0110125 A1 | 5/2008 | Pervan |
| 2008/0134614 A1 | 6/2008 | Pervan et al. |
| 2008/0155930 A1 | 7/2008 | Pervan et al. |
| 2008/0302051 A1 * | 12/2008 | Bearinger ............ F16B 12/125 52/582.1 |
| 2009/0042019 A1 | 2/2009 | Nilsson |
| 2009/0129859 A1 | 5/2009 | Andersson |
| 2009/0249723 A1 | 10/2009 | Clark et al. |
| 2010/0009115 A1 | 1/2010 | Ruhdorfer |
| 2010/0021699 A1 | 1/2010 | Engstrom et al. |
| 2010/0043333 A1 | 2/2010 | Hannig |

(56) References Cited

U.S. PATENT DOCUMENTS

| | | | |
|---|---|---|---|
| 2010/0173122 A1 | 7/2010 | Susnjara | |
| 2010/0189492 A1 | 7/2010 | Green | |
| 2010/0205888 A1 | 8/2010 | Krige | |
| 2010/0290831 A1 | 11/2010 | Burnett et al. | |
| 2010/0319292 A1 | 12/2010 | Moriau et al. | |
| 2010/0319929 A1 | 12/2010 | Moriau et al. | |
| 2011/0023405 A1 | 2/2011 | Moriau et al. | |
| 2011/0126487 A1 | 6/2011 | Browning et al. | |
| 2011/0206448 A1 | 8/2011 | Clinch et al. | |
| 2011/0271632 A1 | 11/2011 | Cappelle et al. | |
| 2011/0280655 A1 | 11/2011 | Maertens et al. | |
| 2012/0027967 A1 | 2/2012 | Maertens et al. | |
| 2012/0036804 A1 | 2/2012 | Pervan | |
| 2012/0073235 A1 | 3/2012 | Hannig | |
| 2012/0133259 A1 | 5/2012 | Babucke-Runte et al. | |
| 2012/0217671 A1 | 8/2012 | Nilsson | |
| 2013/0051905 A1 | 2/2013 | Andersson | |
| 2013/0071172 A1* | 3/2013 | Maertens | A47B 47/042 403/27 |
| 2013/0104487 A1 | 5/2013 | Moriau et al. | |
| 2013/0170904 A1 | 7/2013 | Cappelle et al. | |
| 2013/0241103 A1 | 9/2013 | Engstrom | |
| 2014/0033630 A1 | 2/2014 | Engstrom | |
| 2014/0042115 A1 | 2/2014 | Lee | |
| 2014/0130437 A1 | 5/2014 | Cappelle | |
| 2014/0190112 A1 | 7/2014 | Pervan et al. | |
| 2014/0255092 A1 | 9/2014 | Andersson | |

FOREIGN PATENT DOCUMENTS

| | | |
|---|---|---|
| CA | 1 065 944 A1 | 11/1979 |
| CA | 1 240 914 A1 | 8/1988 |
| CA | 1 279 814 C | 2/1991 |
| CA | 1 296 611 C | 3/1992 |
| CA | 1 297 525 C | 3/1992 |
| CH | 83681 A | 1/1920 |
| CH | 616 617 A5 | 4/1980 |
| CN | 2404402 Y | 11/2000 |
| CN | 2492701 Y | 5/2002 |
| CN | 101099618 A | 1/2008 |
| DE | 808 626 C | 7/1951 |
| DE | 1 812 390 U | 6/1960 |
| DE | 1 484 108 A1 | 4/1969 |
| DE | 1 298 440 B | 6/1969 |
| DE | 6909680 U | 9/1969 |
| DE | 6923049 U | 10/1969 |
| DE | 1 935 283 A1 | 1/1971 |
| DE | 1654545 A1 | 5/1971 |
| DE | 1 955 922 A1 | 6/1971 |
| DE | 2 008 785 A1 | 9/1971 |
| DE | 2 153 713 A1 | 5/1973 |
| DE | 2 300 675 A1 | 7/1974 |
| DE | 24 26 722 A1 | 12/1975 |
| DE | 23 30 532 B2 | 9/1978 |
| DE | 30 41 781 A1 | 6/1982 |
| DE | 32 44 398 C2 | 5/1985 |
| DE | 87 08 112 U1 | 9/1987 |
| DE | 42 24 250 A1 | 1/1994 |
| DE | 19 503 948 A1 | 8/1996 |
| DE | 197 06 651 A1 | 8/1998 |
| DE | 198 27 597 A1 | 12/1999 |
| DE | 200 09 333 U1 | 9/2000 |
| DE | 39 37 231 C2 | 1/2001 |
| DE | 20 2004 010 897 U1 | 11/2004 |
| DE | 20 2004 013 651 U1 | 11/2004 |
| DE | 20 2005 005 498 U1 | 6/2005 |
| DE | 10 2004 055 951 A1 | 7/2005 |
| DE | 103 44 161 B4 | 9/2005 |
| DE | 20 2004 019 882 U1 | 4/2006 |
| DE | 10 2008 005 067 A1 | 7/2009 |
| DE | 20 2008 004 145 U1 | 8/2009 |
| DE | 20 2008 004 148 U1 | 8/2009 |
| DE | 20 2009 008 825 U1 | 10/2009 |
| DE | 20 2009 010 381 U1 | 11/2009 |
| DE | 20 2009 018 418 U1 | 8/2011 |
| DE | 10 2006 007 522 B4 | 1/2013 |
| EP | 0 077 092 A1 | 4/1983 |
| EP | 0 274 683 A1 | 7/1988 |
| EP | 0 330 748 A2 | 9/1989 |
| EP | 0 479 767 A1 | 4/1992 |
| EP | 0 423 596 B1 | 4/1993 |
| EP | 0 698 357 A1 | 2/1996 |
| EP | 0 543 589 B1 | 4/1996 |
| EP | 0 871 156 A2 | 10/1998 |
| EP | 1 035 334 A1 | 9/2000 |
| EP | 1 344 950 A1 | 9/2003 |
| EP | 1 374 737 A1 | 1/2004 |
| EP | 1 420 125 A2 | 5/2004 |
| EP | 1 554 951 A1 | 7/2005 |
| EP | 1 574 633 A3 | 10/2005 |
| EP | 0 756 044 B1 | 11/2005 |
| EP | 1 671 562 A1 | 6/2006 |
| EP | 2 065 526 A2 | 6/2009 |
| EP | 2 105 063 A1 | 9/2009 |
| EP | 2 105 064 A1 | 9/2009 |
| EP | 2 250 926 A2 | 11/2010 |
| EP | 2 348 222 A1 | 7/2011 |
| EP | 1 647 205 B1 | 12/2011 |
| EP | 2 015 652 B1 | 3/2012 |
| EP | 1 855 854 B1 | 4/2012 |
| EP | 2 260 742 B1 | 9/2012 |
| FR | 1 016 352 A | 11/1952 |
| FR | 1 103 169 A | 10/1955 |
| FR | 1 318 585 A | 2/1963 |
| FR | 1 345 888 A | 12/1963 |
| FR | 1557100 A | 2/1969 |
| FR | 2 143 136 B1 | 7/1973 |
| FR | 2 186 076 A5 | 1/1974 |
| FR | 2 313 629 B1 | 9/1978 |
| FR | 2 597 173 B1 | 10/1988 |
| FR | 2 826 391 A1 | 12/2002 |
| FR | 2 949 046 A1 | 2/2011 |
| GB | 598 687 A | 2/1948 |
| GB | 794 401 A | 5/1958 |
| GB | 1 004 008 A | 9/1965 |
| GB | 1 046 810 A | 10/1966 |
| GB | 2 041 146 A | 9/1980 |
| GB | 2 051 916 A | 1/1981 |
| GB | 2 256 023 A | 11/1992 |
| GB | 2 281 950 A | 3/1995 |
| GB | 2 408 554 A | 6/2005 |
| GB | 2 428 078 B | 8/2008 |
| GB | 2 460 856 A | 12/2009 |
| JP | S58-41251 U | 3/1983 |
| JP | S58-149709 A | 9/1983 |
| JP | H04-50633 U | 4/1992 |
| JP | 2006-020979 A | 1/2006 |
| JP | 4854248 B2 | 1/2012 |
| JP | 3176020 U | 6/2012 |
| JP | 5574316 B2 | 8/2014 |
| NL | 6912630 A | 2/1971 |
| NL | 8502524 A | 4/1987 |
| NL | 1034336 C2 | 3/2009 |
| RU | 2 063 158 C1 | 7/1996 |
| WO | 87/00406 A1 | 1/1987 |
| WO | 94/10462 A1 | 5/1994 |
| WO | 1997047834 A1 | 12/1997 |
| WO | 99/22150 A1 | 5/1999 |
| WO | 02/33271 A1 | 4/2002 |
| WO | 03/016654 A1 | 2/2003 |
| WO | 2004/052150 A1 | 6/2004 |
| WO | 2004/085765 A1 | 10/2004 |
| WO | 2005/020754 A1 | 3/2005 |
| WO | 2005/046950 A1 | 5/2005 |
| WO | 2006/008393 A1 | 1/2006 |
| WO | 2007/079845 A1 | 7/2007 |
| WO | 2007/131903 A2 | 11/2007 |
| WO | 2007/145572 A1 | 12/2007 |
| WO | 2008/021044 A2 | 2/2008 |
| WO | 2008/068245 A1 | 6/2008 |
| WO | 2008/083662 A1 | 7/2008 |
| WO | 2008/098783 A1 | 8/2008 |
| WO | 2008150234 A1 | 12/2008 |

(56) References Cited

FOREIGN PATENT DOCUMENTS

| WO | 2009/066153 A2 | | 5/2009 |
|---|---|---|---|
| WO | 2010070472 A2 | | 6/2010 |
| WO | WO 2010/070605 | * | 6/2010 |
| WO | 2010/078509 A1 | | 7/2010 |
| WO | 2009/044235 A8 | | 9/2010 |
| WO | 2011/000751 A1 | | 1/2011 |
| WO | 2011/070307 A1 | | 6/2011 |

OTHER PUBLICATIONS

BE Search Report for corresponding BE Application No. 2011/0448, dated Mar. 28, 2012.
BE Search Report for corresponding BE Application No. 2011/0623, dated Mar. 30, 2012.
International Search Report for corresponding International PCT Application No. PCT/IB2012/053206, dated Sep. 26, 2012.
International Search Report and Written Opinion from International Application No. PCT/IB2009/055816, dated Dec. 2, 2010.
International Search Report and Written Opinion from Application No. PCT/IB2009/054812, dated Dec. 2, 2010.
Search Report and Written Opinion of EPO from Belgium Patent Application 2008/0677, dated Oct. 28, 2009.
EP opposition case against European Patent No. 2 378 921 B1, Dec. 19, 2014.

* cited by examiner

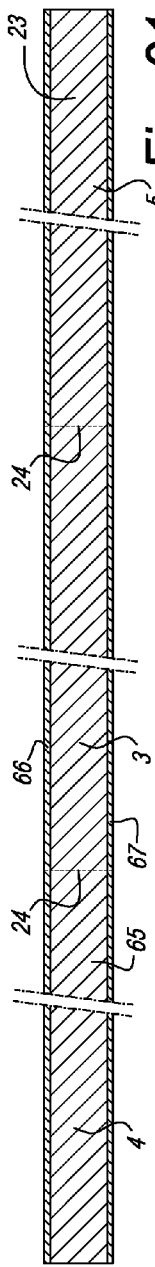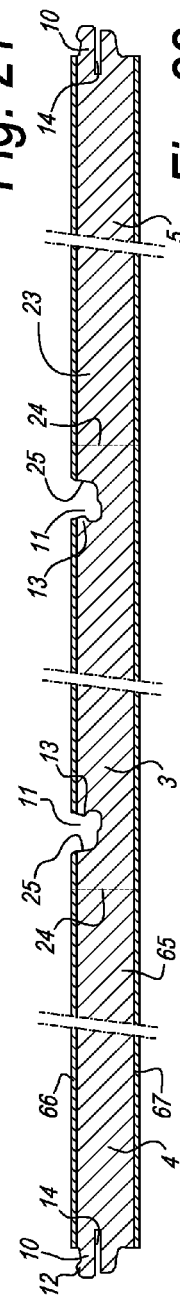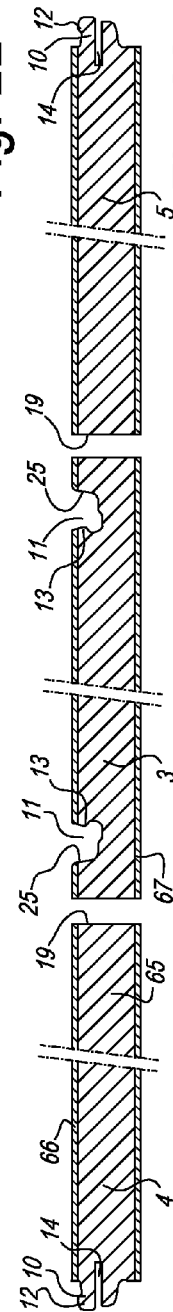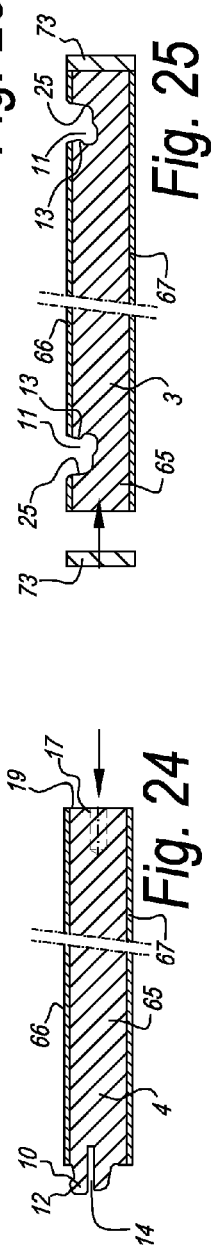

DRAWER, DRAWER CONSTRUCTION AND METHOD FOR MANUFACTURING A DRAWER

This application claims the benefit under 35 U.S.C. 119(e) to the U.S. provisional application No. 61/503,814 filed on Jul. 1, 2011.

BACKGROUND

1. Field of the Disclosure

This invention relates to a drawer, a drawer construction and to methods for manufacturing drawers.

It is known that drawers mostly are composed of a plurality of parts or walls, such as, for example, a front wall, a rear wall, sidewalls and a bottom. Such drawers, or certain parts thereof, are often produced in large quantities by specialized manufacturers, who then sell these drawers or partial drawer products to furniture assemblers. As such, it is clear that small optimizations in the production and assembly of such drawers can result in considerable economic advantages.

2. Related Art

In WO 2010/070472, it was already proposed to couple the walls of a drawer together by means of profiles which can be hooked into each other, such that the use of separate connection elements and the concomitant expenses are excluded. Within the scope of the present invention, however, it was found that simply applying such locking profiles on all corners of a drawer as such is not always advantageous. So, for example, it regularly happens that the front panels of a drawer are realized by the final furniture producer and not by the drawer manufacturer himself. For then realizing the known profiles on the rear side of the front panel, the furniture producer needs to have finger cutters or milling cutters, which is not always the case. Moreover, such milling process is expensive.

SUMMARY OF THE DISCLOSURE

The present invention now aims at well-defined combinations for composing drawers, as well as methods for manufacturing drawers, which allow realizing further optimizations in the production, assembly, respectively, of drawers, which optimizations are of economic and/or technical nature, either in that a smoother production becomes possible, or in that a sturdier construction can be guaranteed.

To this aim, the invention, according to a first aspect, relates to a drawer, which comprises at least a front wall, rear wall and two sidewalls, as well as a bottom, with the characteristic that the rear wall is connected to at least one of the sidewalls by means of mutually cooperating locking profiles, whereas the front wall is connected to at least one of the sidewalls by means of connection means other than locking profiles. Preferably even, the rear wall is connected to both sidewalls by means of locking profiles. Also preferably, the front wall is connected to both sidewalls by means of connection means other than locking profiles.

An important advantage thereof is that as such no locking profile must be provided on the rear side of the front wall, which often forms a difficulty as relatively expensive machines are necessary for this. As a consequence, furniture manufacturers who have all parts of the drawer delivered with the exception of the front wall and who thus want to provide their own front wall on the drawer will not be forced to acquire such machines.

Further, the drawer of the first aspect preferably is characterized in that the front wall is connected to the respective sidewall, and preferably both sidewalls, by means of connection means which are different from locking profiles, however, which are made such that the front wall can be inserted with its rear side onto the distal front ends of the sidewalls, whether or not with additional auxiliary means.

Preferably, the connection means between the front wall and the sidewall are of a type which applies a plug-in principle, with local elements which allow attaching the respective parts into each other by means of an insertion movement.

According to a preferred embodiment, the drawer is characterized in that the connection elements between the front wall and the sidewalls consist of separate connection elements, which cooperate with openings, more particularly bore holes, which are provided in the rear side of the front wall and/or the outer ends of the sidewalls, respectively. Preferably, the connection elements herein consist of dowels, pins or the like, whether or not combined with integrated locking and/or tensioning systems. This allows a simple mounting of the front wall without having to provide intricate profiles. Also, the use of glued dowels is not excluded.

In an embodiment which can be easily put into practice, for the dowels use is made of mechanically locking dowels, more particularly dowels with a ribbed structure or barb structure on both ends.

According to another possibility, use is made of a split plug, which, for example, is fixedly attached into the rear side of the front wall and fits into an opening in the narrow-face end of the respective sidewall and, after assembly, can be activated by means of a tool via an access in the interior sidewall of the drawer and can be brought into a tensioned condition.

According to another particularly advantageous embodiment, use is made of dowels or pins which are mounted in the rear side of the front wall and fit into openings in the narrow-face ends of the sidewalls, wherein in the sidewalls, activatable locking systems are provided, of the type whereby, by turning a cam, eccentric or the like, the pin in the respective opening is tensioned and the front wall is tensioned against the narrow front ends of the sidewalls.

According to another preferred characteristic of the drawer of the first aspect, it makes use of locking profiles exclusively for the connection between the rear wall and the sidewalls, and the component parts thereof for composing the drawer further only make use of bore holes and possibly of additional elements. In this manner, only the aforementioned profiles will have to be realized by means of appropriate machines, whereas all other treatments can be realized in a classical bore line.

Further, the drawer of the first aspect may also show a construction having one or more of the following characteristics:

- the locking profiles are laterally insertable, such by means of an angling and/or snap movement;
- the front wall consists of only one wall part, which thus also forms the front part of the drawer;
- the front wall is made as a front panel, which, with its rear side, is turned towards the narrow front ends of the sidewalls;
- the rear wall is situated between the sidewalls, by which is meant that the rear wall, with its narrow faces, adjoins against the interior sides of the sidewalls;

the sidewalls are provided with openings and/or recesses for attaching fittings, more particularly for attaching thereto parts of a fitting mechanism for retractably supporting the drawer.

According to a second aspect, the invention relates to a drawer which comprises at least a front wall, rear wall and two sidewalls, as well as a bottom, wherein both sidewalls are connected to both the front wall and the rear wall by means of profiles which fit into each other in a locking manner and which use a tongue and groove with locking parts, wherein these profiles can be inserted laterally into each other, with the characteristic that the front wall is attached directly to the sidewalls and that the connection between the front wall and the sidewalls is achieved in that the respective tongues are provided distally on the foremost ends of the sidewalls, wherein these tongues are realized as solid tongue profiles and thus not split, wherein the respective grooves are situated on the rear side of the front wall, and wherein the tongues fit into the respective grooves by means of an angling movement. The use of non-split tongues on the location of the front wall offers the advantage that a particularly solid connection between the front wall and the sidewalls can be provided.

According to a third aspect, the invention relates to a method for manufacturing drawers, wherein the drawers comprise at least a front wall, rear wall and two sidewalls, as well as a bottom, wherein the two sidewalls as well as the rear wall comprise profiles which fit into each other in a locking manner, and which to this aim make use of a tongue and groove with locking parts, wherein these profiles can be inserted laterally into each other, and wherein the groove respectively is provided on the interior side of a sidewall, with the characteristic that at least two sidewalls are manufactured of one board, respectively; that herein, the grooves are realized by means of a continuous treatment, whether or not consisting of a plurality of partial treatments, such as milling cycles; and that only afterwards said board is subdivided into two or more sidewalls.

This technique has the advantage that in a smooth manner, grooves can be realized in a plurality of sidewalls in one go, which is time-saving.

This method is particularly suitable for realizing drawers according to the first aspect.

According to a fourth aspect, the invention relates to a method for manufacturing a composed element, wherein two panel-shaped elements are provided with locking profiles allowing to couple the former to each other at an angle, such in the form of a tongue profile and a groove profile, characterized in that the groove profile at least at one end is discontinuous and that this groove profile is realized by means of one or more cuts by means of one or more rotating cutting tools which engage in the surface from the exterior, wherein the cutting tool and the respective panel-shaped element, in mutual respect, perform a pass-through movement in the longitudinal direction of the cut, as well as is locally moved in and/or out of the surface of the panel-shaped element in order to form said end.

The advantage of this technique is that finite, however, locking groove profiles can be realized in a continuous manner, by means of continuous milling machines or the like.

The technique is particularly useful for corner connections between a front wall of a drawer and the sidewalls thereof, where the final groove profile preferably does not reach up to above the sidewalls.

According to a fifth aspect, the invention relates to a drawer which comprises at least a front wall, more particularly a front panel, two sidewalls, as well as a bottom, characterized in that the drawer comprises a fitting part which forms part of or which directly cooperates with a guiding mechanism for retracting the drawer, wherein this fitting part is attached, on the one hand, to a sidewall or another component of the drawer which differs from the front wall, and, on the other hand, also provides for a connection with the front wall, more particularly the front panel, in particular for retaining this front panel.

Hereby, the advantage is obtained that the guiding mechanism, apart from its traditional function, also functions as a connection part between the sidewalls and the front panel.

Here, the invention shows its advantages fully with wood-based drawers, whereas the fitting part mostly consists of metal or synthetic material.

In a practical embodiment, said fitting part is provided with forward-directed protruding parts on which the front can be fixed. However, other attachment techniques, whether or not by means of screws, are not excluded.

According to the sixth aspect, the invention relates to a drawer construction, with a drawer which comprises at least a front wall, rear wall and two sidewalls, as well as a bottom, characterized in that the drawer construction combines at least the following characteristics:
  the front wall is connected to the sidewalls by means of mutually cooperating locking profiles, more particularly profiles which fit into each other laterally, preferably by means of an angling movement;
  the rear wall is connected to the sidewalls by means of connection means other than locking profiles;
  the drawer is movably supported via a fitting mechanism.

The advantage of this combination is that the drawer is easy to assemble, however, that simultaneously therewith it is also obtained that the fitting mechanism also provides for that the sidewalls cannot move out of each other and/or that they are loaded less, as the fitting mechanism retains certain parts on a forced location.

According to various preferred embodiments, the drawer construction further is characterized by one of the following possibilities:
  that the rear wall is situated between the sidewalls and that the rear wall is connected to the sidewalls by means of coupling means which allow attaching the sidewalls laterally onto the distal ends of the rear wall, preferably by means of dowels or the like;
  that the fitting mechanism is of the type which provides for a support offering positive lateral support;
  that said fitting mechanism is attached to the drawer by means of fitting parts which are attached to the sidewalls, more particularly laterally against them or underneath.

According to a seventh aspect, the invention relates to a drawer which comprises at least a front wall, rear wall and two sidewalls, as well as a bottom, characterized in that the drawer combines at least the following characteristics:
  the front wall is connected to the sidewalls by means of mutually cooperating locking profiles which laterally fit into each other, this by means of an angling movement, wherein the sidewalls can be attached to the front wall, in respect to the drawer to be formed, by means of an angling movement from the inside towards the outside;
  the rear wall is connected to the sidewalls by means of locking means other than locking profiles.

The advantage hereof is that, once the rear wall is attached, the sidewalls cannot be separated by themselves. Another advantages is that the profiles then can be made such that towards the end of the turning movement of the sidewalls, a slight tensioning or pre-tension is achieved, which contributes to the stability of the whole.

According to a preferred embodiment of the seventh aspect, the rear wall is situated between the sidewalls and the rear wall is connected to the sidewalls by means of coupling means allowing to attach the sidewalls laterally onto the distal ends of the rear wall, preferably by means of dowels or the like. More particularly still, use is made of dowels or the like which are put through the sidewalls, such that the sidewalls do not have to be drawn apart especially for providing the rear wall with the plugs between the sidewalls.

According to an eighth aspect, the invention relates to a drawer which comprises at least a front wall, rear wall and two sidewalls, as well as a bottom, characterized in that the drawer combines at least the following characteristics:

the front wall is connected to the sidewalls by means of mutually cooperating locking profiles which laterally fit into each other, this preferably by means of an angling movement;

the rear wall is connected to the sidewalls by means of dowels or the like, which are put through the sidewalls up into the distal ends of the rear wall.

This enables a smooth assembly.

According to the ninth aspect, the invention relates to a drawer which comprises at least a front wall, rear wall and two sidewalls, as well as a bottom, characterized in that the drawer combines at least the following characteristics:

at least one of the walls, preferably the front wall, is attached with its interior side on opposite sides to the two distal ends of the two walls adjoining thereto, by means of locking profiles formed by grooves in the interior sides and tongues on the distal ends;

the tongues and grooves are realized such that such tongue can be inserted into the pertaining groove without any angling or almost without any angling, by means of an inclined displacement, whereas an insertion of the tongue into the groove by means of a displacement perpendicular to said interior side is impossible;

the whole of the drawer is configured such that, once the whole is assembled, the inclined displacement is made impossible and sliding apart again is prevented.

The ninth aspect offers the advantage that the two walls can be provided with their tongues in the grooves in a simple manner.

Preferably, the inclined displacement is made impossible by the bottom, by the mutual orientation of the pair of tongues and grooves and/or by the remaining corner connections among the walls. The particular tongues and grooves of the ninth aspect may, for example, be oriented opposite, such that, in case they are applied between the sidewalls and the front wall, the rear wall restricts or avoids an inclined displacement. When both tongues are oriented opposite as they both are directed outward, the bottom contributes to the restriction of the inclined displacement. In such case, a release of the tongue and groove connection is only possible in the direction of the bottom.

It is evident that the ninth aspect, mutatis mutandis, can also be applied broader than only with drawers. Each composed element, consisting of at least four walls and a bottom or back, can show similar characteristics. Herein, this may relate, for example, to a cupboard with a bottom wall, a top wall, two sidewalls and a back, wherein at least one of the walls is attached to two distal ends of adjoining walls by means of the particular tongues and grooves of the ninth aspect.

According to a tenth aspect, the invention relates to a method for manufacturing a drawer, wherein this drawer is of the type which comprises at least two walls, such as sidewalls, which, in mounted condition, are coupled to each other by means of profiles which mutually fit into each other in a locking manner, wherein these profiles are made as a tongue profile and a groove profile, which comprise locking parts, characterized in that the wall with the groove profile is realized at least by transporting a basic panel, in a device provided for this purpose, by means of a pass-through system, starting from a feeding entry, along at least one processing station, towards a discharge exit, wherein the groove profile is drawn in the processing station by means of at least one milling cutter. Up to now, such pass-through systems were applied exclusively for performing bore holes. By now also making use of milling cutters, profiles, too, can be realized therewith. The method of the tenth aspect can be applied for realizing a groove profile in any wall, in one or more sidewalls, in a rear wall and/or in a front wall, or front panel.

According to a preferred embodiment, the method is characterized in that a milling cutter is applied having a widened part which forms an undercut in order to retain the locking part which has to be formed at the groove, wherein this part rotates entirely in the thickness of the basic panel.

The invention shows its benefits in particular when a finite groove profile is realized, as often such finite groove is difficult to realize otherwise.

According to a particular embodiment, the groove profile is made finite at one end and is realized by moving the milling cutter from an edge of the basic panel into and out of this basic panel.

According to another possibility, the groove profile is made finite at both ends and is realized by lowering the milling cutter into the basic panel and mutually displacing the milling cutter and the basic panel, over a certain length, whether or not to and fro, and subsequently pulling it out of the basic panel again.

According to a preferred characteristic, for milling the groove profile an undoubling of the milling treatments is provided, more particularly in order to achieve a higher pass-through speed.

Such undoubling may be performed by forming the same groove profile simultaneously with two or more milling cutters, which each realize a different part of the groove profile.

According to another possibility, such undoubling can be performed by employing two or more processing stations in the pass-through direction, which each perform milling treatments on different basic panels.

Preferably, such basic panel is kept stationary during milling, whereas the milling cutter is displaced, the milling cutters are displaced, respectively.

In a preferred embodiment, in the same device kept stationary also a groove is realized in the basic panel, more particularly by means of a rotating tool, such as a saw or a saw cutter, in order to form a seat for the edge of the bottom. Preferably, the basic panel is kept stationary while the groove is provided, whereas the rotating tool is displaced.

In a practical embodiment, the method is realized on a device which is formed by a bore station, more particularly a bore line, wherein this bore station is provided with one or more milling aggregates, by which a milling cutter can be displaced up and down as well as laterally. In the same device, also one or more bore holes can be formed in the basic panel.

Further, the invention also relates to a device for realizing the method described herein above, with the characteristic that it consists of a pass-through system and various processing stations arranged along it, for performing one or more of the above-described treatments.

According to an eleventh aspect, the invention relates to a method for manufacturing drawers, wherein the drawers comprise walls, as well as a bottom, wherein said walls comprise at least a front wall, rear wall and two sidewalls, and wherein at least a first and a second of said walls comprise profiles which fit into each other in a locking manner and which, for this purpose, make use of a tongue and groove with locking parts, wherein these profiles can be joined laterally into each other, and wherein the respective groove is provided on the interior side of the first wall, whereas the respective tongue is provided on the distal end of the second wall, with the characteristic that said first and second wall are manufactured of respectively one board; that herein, the respective groove and the respective tongue are formed by means of a treatment, whether or not consisting of several partial treatments, performed on said board; and that only afterwards said board is subdivided into two or more walls.

Preferably, the treatment of the eleventh aspect relates to a pass-through treatment.

Preferably, said tongue is formed on a distal end of said board. However, this does not exclude the possibility that the tongue, instead of being formed at the distal end of the board, is formed on another location in the board, for example, where two final walls at that moment still are connected to each other in one piece.

Preferably, said groove is formed in a flat side of said board.

According to the most preferred embodiment of the eleventh aspect, from said board preferably three walls are obtained, namely two sidewalls and a front wall or a rear wall. Preferably, all locking profiles of the respective walls are formed at least partially or even entirely prior to subdividing said board into the respective three walls.

Alternatively, also more than three walls can be realized from a single board, for example, the two sidewalls as well as the front wall and rear wall.

It is noted that one wall to be formed may also consist of one or more partial walls. So, for example, may a rear wall comprise an inwardly recessed portion which surrounds a recess in the drawer, such as a recess for offering space for sanitary pipes in the case of a drawer which is intended for being provided in a piece of furniture for kitchen or bathroom comprising a washbasin. The different partial walls then can also be realized from a single board, preferably also together with at least the sidewalls.

It is clear that, when, as aforementioned, such locking profile, in other words, such locking tongue or groove profile, is formed "entirely" prior to subdividing the board into walls, it is meant that the entire interior wall of the groove and/or the entire exterior wall of the tongue is realized before the board is subdivided.

It is also clear that, when, as aforementioned, such locking profile, in other words, such locking tongue or groove profile, is "partially" formed prior to subdividing the board into walls, it is intended that only a part of the interior wall of the groove and/or only a part of the exterior wall of the tongue, is realized before the board is subdivided. The remaining part of the respective locking profile, in other words, the still to be realized wall part of the groove or tongue, is then realized as a result of subdividing the board into the respective walls, and/or by means of one or more further treatments which are performed after subdividing. Herein, by the cut or the like which provides for the subdividing, then a part of, for example, the tongue surface can be formed.

It is possible that after dividing the respective board, other treatments, such as edge treatments, will have to be performed on one or more of the obtained walls. Preferably, after dividing, still one or more treatments are performed for realizing connection means other than locking profiles. Preferably, for this purpose bore holes will be drilled, for example, for providing dowels or other fittings. Preferably, also one or more masking treatments will be performed, for example by means of a laminate strip or an ABS strip.

According to particular embodiments, the method of the eleventh aspect can show also the characteristics of the third, the fourth and/or the tenth aspect.

It is self-evident that the method of the eleventh aspect can be applied for realizing drawers which show the characteristics of the first, the second, the fifth, the sixth, the seventh, the eighth or the ninth aspect.

It is clear that the invention generally relates in particular to drawers wherein the walls thereof are manufactured of wood-based material, such as particle board, MDF, HDF or the like, and wherein the locking profiles are realized by means of machining cutting tools, for example, milling cutters.

The various walls can be covered, for example, with laminate or foil. Also, provisions can be made for obtaining that in mounted condition, the ends of the profiles are hidden from view, for example, by means of glue-on masking strips, such as described in WO 2010/070472.

It is noted that in general in respect to the invention according to all of its aspects, reference is made to walls of a drawer and that these walls may relate to sidewalls, rear walls, front walls or front panels, or possibly even the back. It is not excluded that techniques, which are described specifically referring to one type of walls, for example, to the sidewalls, can also be applied with another type of walls, for example, the front walls or front panels. Further, it is not excluded that the invention according to all of its aspects is applied with other furniture or furniture parts than drawers. For example, a composed element can be concerned, consisting of at least four walls and a bottom. Herein, this may relate, for example, to a cupboard with a bottom wall, a top wall, two sidewalls and a back, wherein at least one of the walls is attached to two distal ends of adjoining walls by means of the tongues and grooves of the invention.

BRIEF DESCRIPTION OF THE DRAWINGS

With the intention of better showing the characteristic according to the invention, hereinafter, as an example without any limitative character, some preferred embodiments are described, with reference to the accompanying drawings, wherein:

FIGS. 21 to 23 represent cross-sections according to the lines XXI-XXI, XXII-XXII, XXXIII-XXXIII indicated in FIG. 20;

FIGS. 24 and 25 represent possible finishing processes of the method from FIG. 20.

DETAILED DESCRIPTION OF PREFERRED EMBODIMENTS OF THE DISCLOSURE

Figures 1, 3:
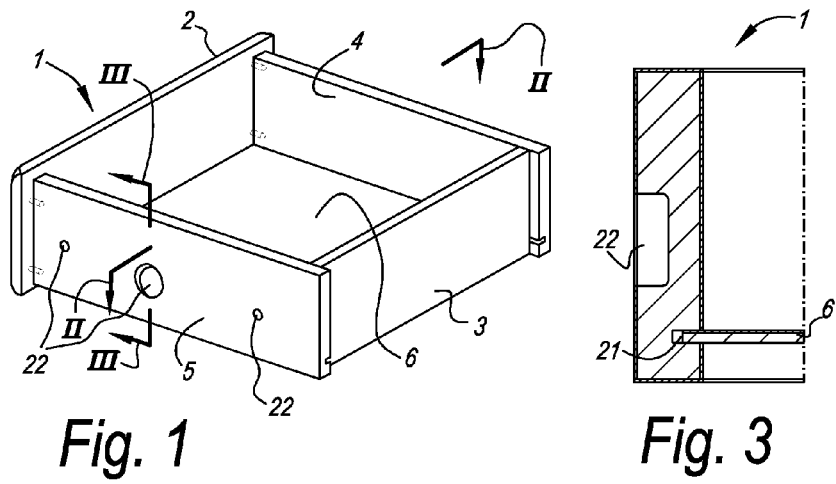
FIG. 1 in perspective represents a drawer according to the invention.
FIGS. 2 and 3 at a larger scale represent sections according to lines II-II and III-III in FIG. 1.
Figure 2:
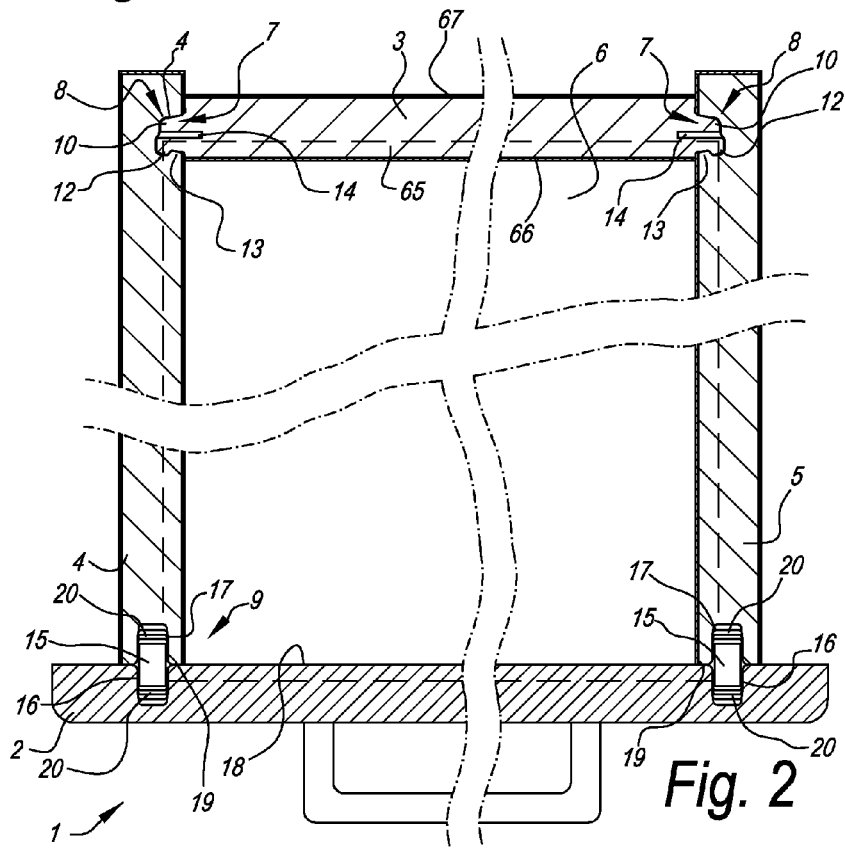

In FIGS. 1 to 3, a drawer 1 is represented which is realized in accordance with the first aspect of the invention. Herein, the drawer 1 comprises at least a front wall 2, a rear wall 3 and two sidewalls 4-5, as well as a bottom 6.

In accordance with the first aspect of the invention, the rear wall 3 is connected to the sidewalls 4-5 by means of mutually cooperating locking profiles 7-8, whereas the front wall 2 is connected to the sidewalls 4-5 by means of connection means 9 other than locking profiles.

In the represented example, the locking profiles 7-8 respectively consist of a tongue 10 and a groove 11, which are provided with respective locking parts 12-13, which, in the final position, prevent or at least counteract that the tongue 10 comes out of the groove 11. In the represented example, the tongue 10 is split. Applying a gap 14 in the tongue 10 is useful in particular when it is required that the tongue 10 can be pushed into the groove 11 by means of a snap movement, as this promotes the elasticity of the tongue. According to a not-represented variant, use can also be made of solid tongues, thus, without the represented gap.

The profiles 7-8 of the represented example allow joining together the sidewalls 4-5 and the rear wall by means of an angling movement as well as a snap movement.

In the represented example, the connection means 9 between the front wall 2 and the sidewalls 4-5 consist of separate connection elements 15, which cooperate with openings 16-17, more particularly bore holes, which are provided in the rear side 18 of the front wall 2 and the narrow ends 19 of the side walls 4-5. In the example, these connection elements 15 are formed by dowels, more particularly mechanically locking dowels. In FIG. 2, to this aim dowels with a ribbed surface, more particularly a surface 20 ribbed in barb-shape, is applied.

As explained in the introduction, other connection means can be applied as well.

As becomes clear from the figures, the drawer 1 can be designed such that the only locking profiles which are present there are the ones required for the connection between the rear wall 3 and the sidewalls 4-5, whereas for the remaining connections, exclusively use is made of bore holes or other treatments which can be performed in a bore line, in which then separate attachment elements can be provided, all this possibly supplemented by simpler profiles, such as grooves 21 for providing the bottom.

Also, the following characteristics can be seen in the figures:
- The locking profiles are laterally insertable, such by means of an angling and/or snap movement;
- the front wall consists of only one wall part, which thus also forms the front part of the drawer;
- the front wall is made as a front panel, which, with its rear side, is turned towards the narrow front ends of the sidewalls;
- the rear wall is situated between the sidewalls;
- the sidewalls are provided with openings and/or recesses 22 for attaching fittings, more particularly for attaching thereto parts of a fitting mechanism for retractably supporting the drawer.

Figure 4:
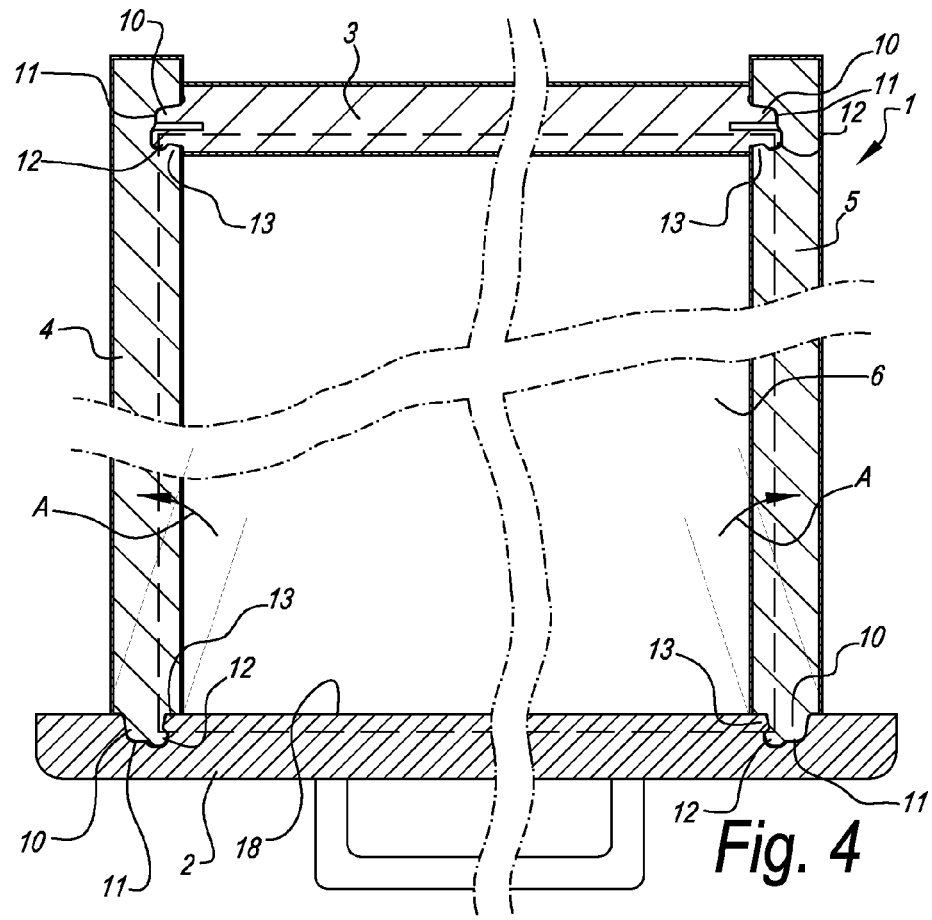
FIG. 4 represents another drawer according to the invention.

In FIG. 4, a drawer 1 is represented which forms an example of the second aspect of the invention. As represented, the drawer 1 comprises a front wall 2, a rear wall 3 and two sidewalls 4-5, as well as a bottom 6. Further, both sidewalls 4-5 are connected both to the front wall 2 and the rear wall 3 by means of profiles, which fit into each other in a locking manner and which use a tongue 10 and groove 11 with locking parts 12-13, wherein these profiles can be inserted laterally into each other. The particularity consists in that the front wall 2 is attached directly to the sidewalls 4-5 and that the connection between the front wall 2 and the sidewalls 4-5 is achieved in that the respective tongues 10 are provided distally on the foremost ends of the sidewalls 4-5, wherein these tongues 10 are realized as solid tongue profiles and thus not split, wherein the respective grooves 11 are situated on the rear side of the front wall 2, and wherein the tongues 10 fit into the respective grooves 11 by means of an angling movement A of the sidewalls. It is clear that in this manner a rigid connection between the front wall 2 and the sidewalls 4-5 can be realized, by which the front is attached to the remainder of the drawer 1 in a particularly stable manner.

Figure 5:
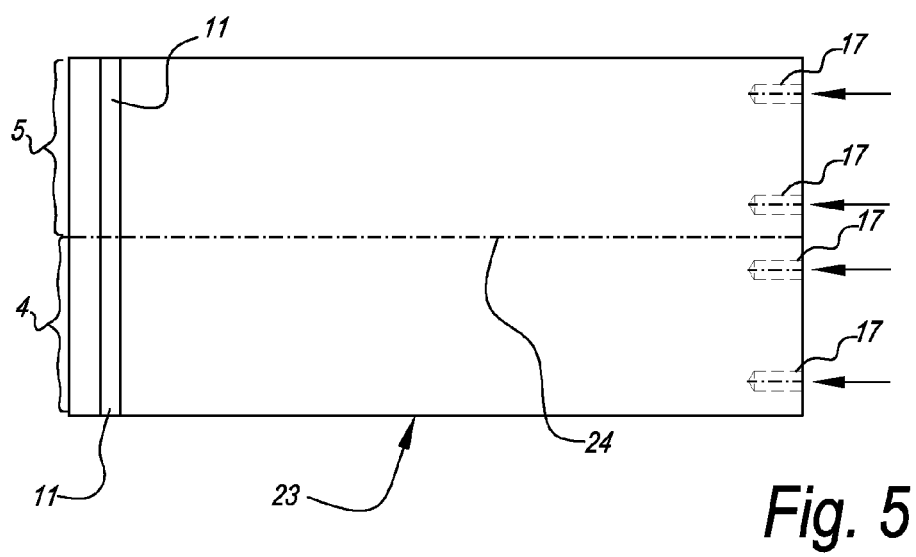
FIG. 5 schematically represents a step of a method according to the invention.

In FIG. 5, the method according to the third aspect of the invention is illustrated. As already mentioned in the introduction, it relates to manufacturing drawers, wherein the drawers 1 comprise at least a front wall 2, rear wall 3 and two sidewalls 4-5, as well as a bottom, and wherein the two sidewalls 4-5 as well as the rear wall 3 comprise profiles which fit into each other in a locking manner, and which to this aim make use of a tongue 10 and groove 11 with locking parts 12-13, wherein these profiles can be inserted laterally into each other, and wherein the groove 11 respectively is provided on the interior side of a sidewall. As FIG. 5 represents, the particularity of the method consists in that at least two sidewalls 4-5 are manufactured of one board 23, respectively; that herein, the grooves 11 are realized by means of a continuous treatment, whether or not consisting of a plurality of partial treatments, such as milling cycles; and that only afterwards said board is subdivided into two or more sidewalls. Subdividing is performed according to the represented line 24, for example, by means of a saw treatment.

This results in the advantages mentioned in the introduction.

The two sidewalls 4-5 preferably are the ones which are intended to form part of one and the same drawer 1.

Further, for realizing connections with the front wall, openings 17, such as bore holes, can be provided in the board 23 before the latter is sawed.

Obviously, the method is particularly suitable for realizing drawers according to the first aspect.

Figure 6:
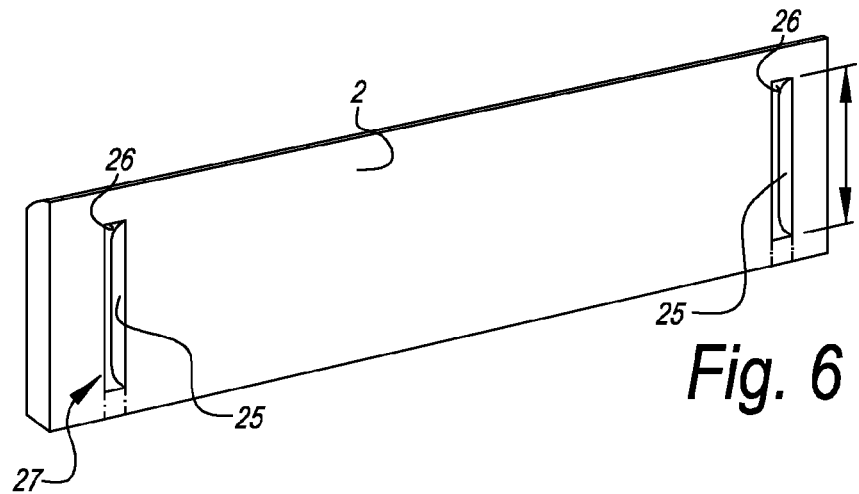
FIGS. 6 to 8 schematically illustrate another particular method of the invention.
Figure 7:
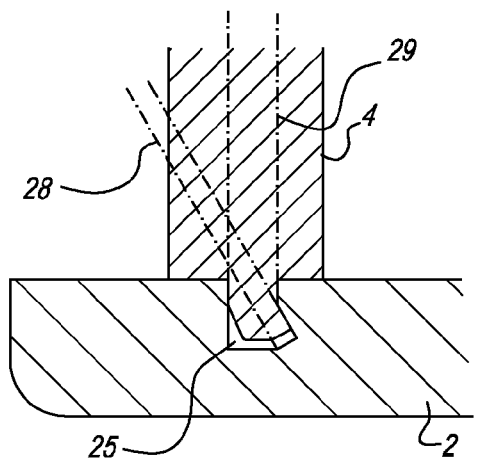
Figure 8:
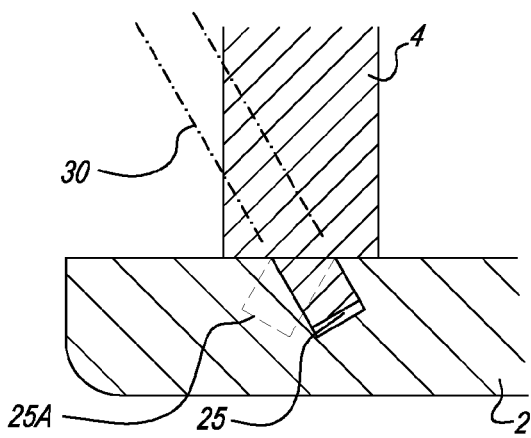

FIGS. 6 to 8 illustrate the fourth aspect of the invention, this applied to the component parts of a drawer. As an example, in FIG. 6 a front of a drawer 1 is represented, with two locking groove profiles 25 on the rear side, to which sidewalls 4-5 can be coupled, wherein the groove profiles 25, at least at one of their ends 26, are discontinuous. Further, it is represented in full line that such groove profile 25 can also be made discontinuous on the other end 27, or, according to an alternative, which is depicted in dashed line, may be continuous indeed.

The particularity herein consists in that the groove profile 25 is realized by one or more cuts by means of one or more rotating cutting tools which engage in the surface from the exterior, wherein the cutting tool and the respective panel-shaped element, in mutual respect, perform a pass-through movement in the longitudinal direction of the cut, as well as is locally moved in and/or out of the surface of the panel-shaped element in order to form said end.

The cuts preferably are realized by means of saws or saw cutters.

FIG. 7 represents an embodiment wherein the groove profile 25 is realized by means of two cuts 28-29. FIG. 8 represents a second embodiment wherein the groove profile is realized by only one cut 30. By pushing the cutting tools applied therewith locally into the panel-shaped elements and/or lifting them out of them, then locking groove profiles, which are finite at least at one end, can be realized in a pass-through operation and thus in a very efficient manner.

Figure 9:
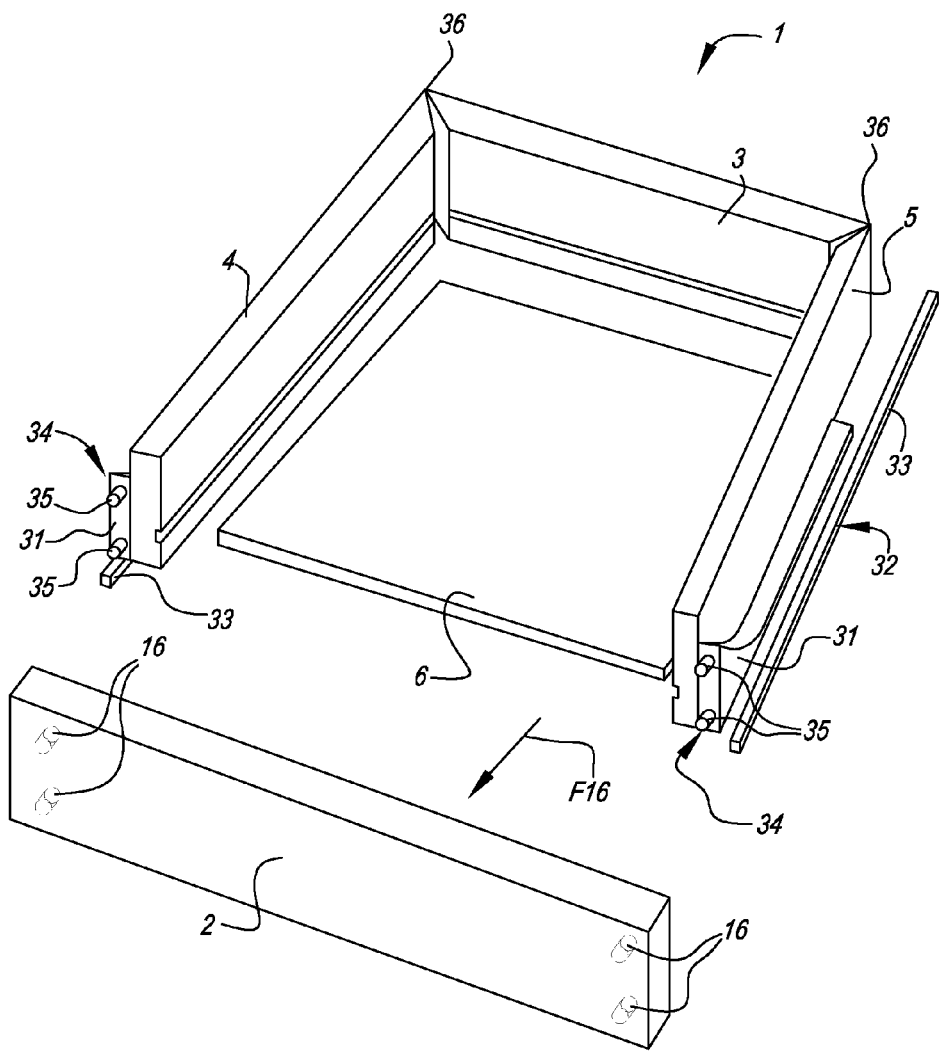
FIG. 9 schematically and in an exploded view represents another drawer according to the invention.

In FIG. 9, an example of the fifth aspect of the invention is represented. According to this aspect, this relates to a drawer 1 which comprises at least a front wall 2, more particularly a front panel, two sidewalls 4-5, as well as a bottom 6, with the characteristic that the drawer comprises a fitting part 31 which forms part of or which directly cooperates with a guiding mechanism 32 for retracting the drawer, wherein this fitting part 31 is attached, on the one hand, to a sidewall 4-5 and, on the other hand, also provides for a connection with the front wall 2, more particularly the front panel. It is clear that the front panel consequently obtains an additional function, which leads to a stable and advantageous assembly.

The guiding mechanism 32 is represented only schematically in the form of fitting parts, namely first fitting parts 31, which are attached to the drawer, and second fitting parts 33, which are fixedly attached to a piece of furniture. The portion present in between these can be of any kind and, for reasons of schematization, is omitted from the figure. By way of example, the portion present in between may consist of a telescopic system, a ball-bearing running system, and so on.

The fitting parts 31 can be attached to the drawer, in particular to the sidewalls 4-5, in any manner, either by means of screws or in another manner. In the example, these fitting parts are situated laterally against the sidewalls 4-5; however, it is clear that, according to a variant not represented here, they can also be mounted, for example, underneath the sides 4-5.

The attachment between the front wall 2 and the fitting parts 31 can also be realized in any manner. In the represented example, to this aim the first fitting part 31 is provided with forward-directed protruding portions 35, onto which the front wall, more particularly the front panel, can be attached in that the portions 35 cooperate with openings 16, for example, via clamps, glue, etc.

In the example, the sidewalls 4-5 are connected to the rear wall 3 by means of film hinges 36. However, other kinds of connections are not excluded here. According to a not represented embodiment, instead of film hinges use shall be made of coupling means which are formed by mutually engaging profiles, for example, such as in FIG. 2.

Figure 10:
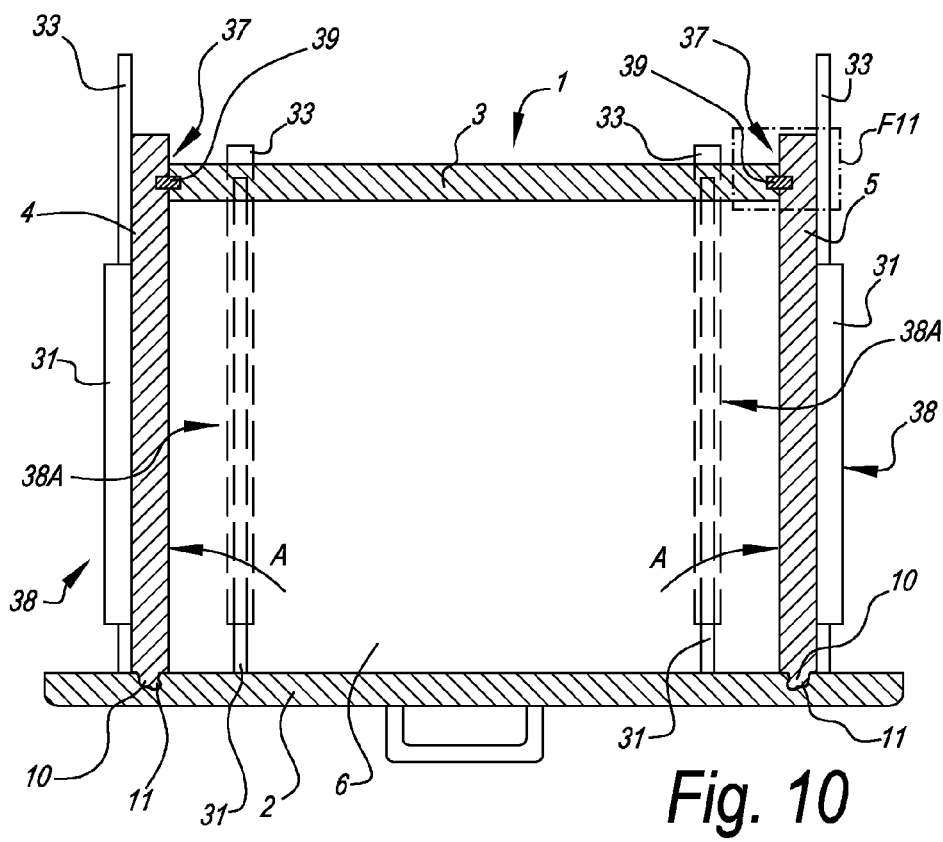
FIG. 10, strongly schematic and in top view, represents another drawer according to the invention.

In FIG. 10, schematically some more possibilities of the sixth aspect of the invention are represented. Herein, this relates to a drawer construction with a drawer 1, which comprises at least a front wall 2, rear wall 3 and two sidewalls 4-5, as well as a bottom 6, with the particularity that the drawer construction combines at least the following characteristics:

the front wall 2 is connected to the sidewalls 4-5 by means of mutually cooperating locking profiles, more particularly profiles which fit into each other laterally, preferably by means of an angling movement;

the rear wall 3 is connected to the sidewalls by means of connection means 37 other than locking profiles;

the drawer is movably supported via a fitting mechanism, more particularly guiding mechanism 38.

In the example, the rear wall 3 is situated between the sidewalls, and the rear wall 3 is connected to the sidewalls by means of coupling means which allow attaching the sidewalls laterally onto the distal ends of the rear wall, in this case by means of dowels 39.

The fitting parts 31 are attached to the sidewalls 4-5 and movably supported in respect to the fitting parts 33 which are intended for being fixedly attached to a piece of furniture.

As the fitting parts 31 usually are positively supported laterally by the fixed fitting parts 33, it is obtained that, as soon as everything is assembled, at least a certain lateral support is given to the sidewalls 4-5, which prevents that the sidewalls 4-5 can move apart at the rearmost ends if the connection means 37 should not function as intended.

It is noted that the fitting parts 31 do not necessarily have to be situated laterally against the sidewalls 4-5, but can also be mounted underneath the sidewalls.

According to a variant, a guiding mechanism 38A is applied, with fitting parts 31-33 situated underneath the drawer, and wherein, for example, the fitting parts 33 are fixedly attached to the front wall 2 and the rear wall 3. In this manner, also an internal reinforcement is created in the drawer, which, in combination with the particular assembly, results in a drawer which can be assembled in a smooth manner and still clearly is stable.

FIG. 10 also illustrates the seventh aspect of the invention, as the sidewalls can be coupled to the front wall by means of an angling movement A from inside towards outside and this embodiment also shows the other characteristics of the seventh aspect.

Figure 11:
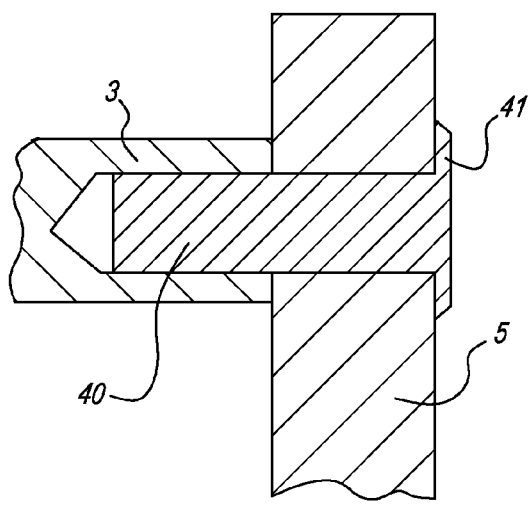
FIG. 11 represents a variant of the part indicated by F11 in FIG. 10.

FIG. 11 represents the use of a dowel 40 which is put through the respective sidewall 5. In practice, the whole will be realized such that the dowel 40 clamps into the rear wall. In the sidewall, it can or cannot be made clamping. In the case of a not-clamping cooperation between the dowel and the sidewall, a collar or head 41 will be provided. Thus, FIG. 11 is illustrative for a particular embodiment of the seventh aspect as well as for the eighth aspect.

It is noted that the aforementioned FIG. 8 is a self-explanatory example of the ninth aspect of the invention. In a still more preferred embodiment, the groove or groove profile 25A, on the left hand side as well as on the right, is directed with its deepest point outward. This latter offers the advantage that in the mounted condition, the bottom will also prevent that the sidewalls come loose from the front wall. As mentioned in the introduction, the inclined displacement preferably is made impossible at least by the remaining corner connections among the walls. This can be achieved, for example, by applying the corner connections represented in FIGS. 2, 4, 10 and 11, between rear wall and sidewalls. Such corner connections namely prevent a mutual removal of the distal ends of the sidewalls, there where the tongues of the ninth aspect are situated. The corner connections of FIG. 9 can be applied, too, however preferably in combination with a groove profile 25A which is directed with its lowest point outward, such that the bottom can also work against a possible inclined displacement of the tongue out of the groove.

Figure 12:
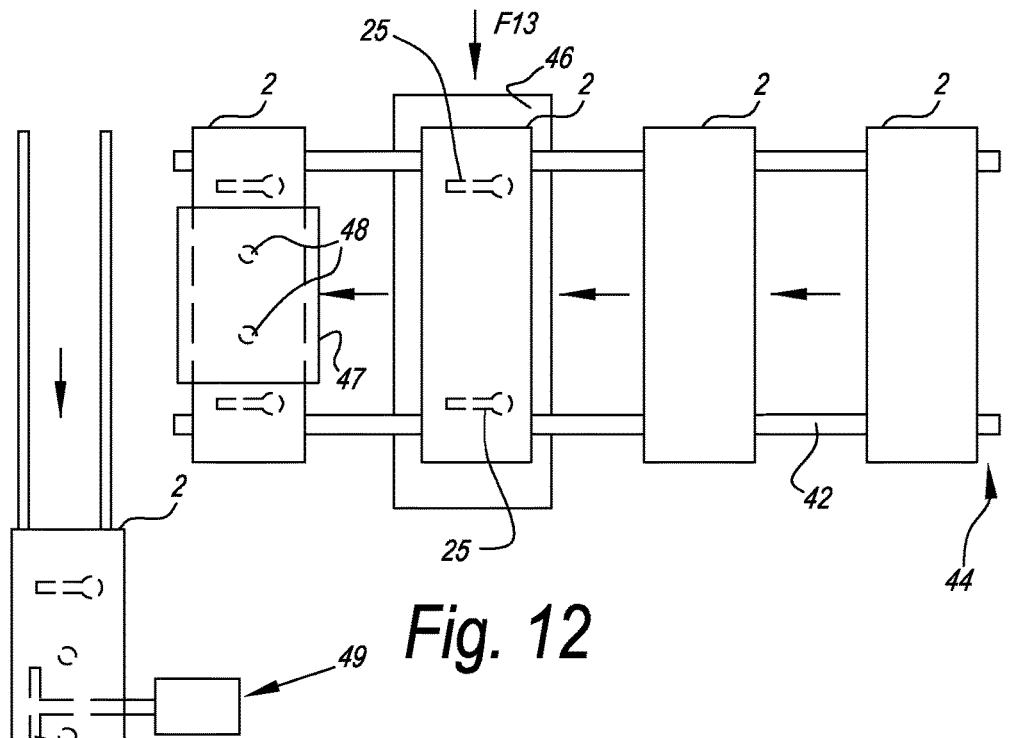
FIG. 12 in top plan view represents a device applying the tenth aspect of the invention.

In FIG. 12, schematically an example is represented of a device applying the method of the tenth aspect, in the case of a front wall or front panel. The device comprises a pass-through system with conveyor belts 42-43 which determine a feeding entry 44 and discharge 45. In a first processing station 46, the front walls 2 are provided with groove profiles 25, by means of milling cutters which preferably engage the front wall from the underside. In the processing station 47, bore holes 48 will be made from above, for example, for providing handles. In the processing station 49, by means of a saw 50 a groove 21 is provided in the downward-directed side, for attaching the bottom. Herein, the front wall moves along the rotating saw. Possibly, the saw may move up and down in a rotating manner when the groove does not have to be made completely continuous. Preferably, in the processing stations the working pieces will be kept stationary.

Figure 13:
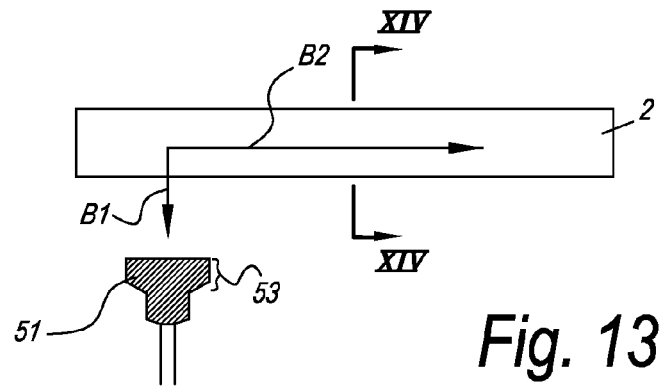
FIG. 13 schematically represents how a groove profile can be realized.
Figure 14:
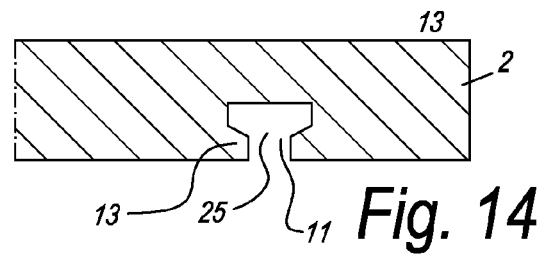
FIG. 14 represents a cross-section according to line XIV-XIV in FIG. 13.

FIGS. 13 and 14 represent how a groove profile 25 can be realized with a milling cutter 51 by means of an entering movement B1 and a to-and-fro movement B2. Herein, FIG. 13 is a schematized view according to arrow F13 in FIG. 12.

Figure 15:
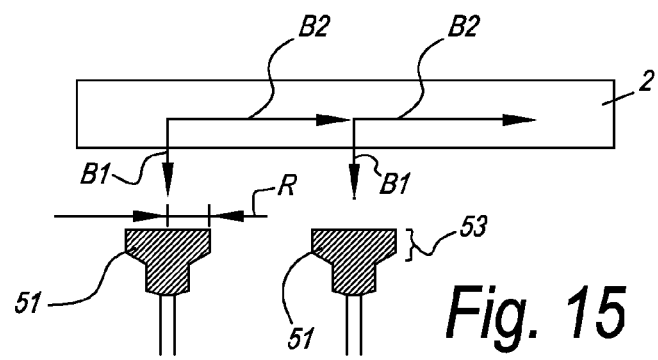
FIG. 15 represents a variant on FIG. 13.

FIG. 15 shows a variant in which an undoubling is applied by making use of two milling cutters 51, such that two smaller movements B2 can be applied which are performed simultaneously, by which time can be saved.

It is clear that with such milling cutter it is also possible to enter on the one side and exit on the other. Possibly, this movement B2 can extend over two walls which still are connected as a single panel, wherein this panel afterwards will be cut in two.

Figure 16:
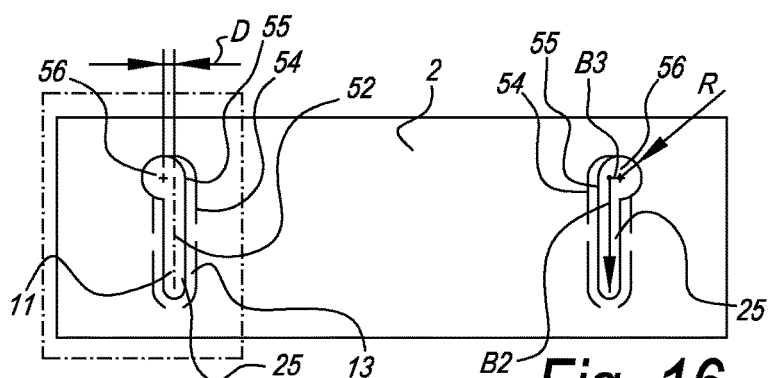
FIG. 16 represents groove profiles for variants, illustrated in a view according to the arrow F16, represented in FIG. 9, for a variant.

FIG. 16 shows a groove profile 25 obtained by means of a variant, wherein by means of a milling cutter 51 an ingoing movement B1 is made at a distance from the motion line B2 or the centerline 52 of the actual groove profile 25. In order to bridge over this distance D, preferably after a widened part 53 of the milling cutter 51 is already situated underneath the surface of the wall 2 to be milled, and still better after this milling cutter 51 has achieved its final depth, the milling cutter 51 performs a lateral movement B3, preferably in the plane of the wall 2. Thereafter, the movement B1 is performed, possibly to and fro, as already described above. It is self-evident that with the exiting movement preferably again the distance D is bridged over, in opposite direction from the initial motion line B3. Generally, the distance D preferably is smaller than the maximum radius R of the milling cutter 1. In this case, a distance D has been chosen which corresponds or approximately corresponds to the undercut to be performed. The outer contours of the obtained groove profile 25 are represented in dashed line 54.

The advantage of entering eccentrically or performing the ingoing movement B1 with the center of the milling cutter at a distance D from the centerline 52 of the groove profile 25 is that a higher-quality cut can be obtained. In particular, the quality of the cut portion 55 in the proximity of the point 56 is increased, where the ingoing movement B1 or the exiting movement of the milling cutter 51 is performed. In general, the improved cut portion 55 preferably is situated at the edge of the groove profile 25 with which the locking part 12 of the tongue 10 cooperates, and/or on the interior side of the composed element or the drawer 1. Improving the quality of the cut is of particular interest for cutting in laminated panels, such as in panels which are provided with a decorative layer of, for example, laminate, lacquer, melamine, PVC foil, veneer and the like. Improving the quality of the cut is also of interest for milling in panels consisting substantially of particle board, such as wood particle board.

Another advantage of entering eccentrically is that a connection can be obtained over a larger part of the groove profile. In fact, the cut portion 55 now can also provide for an undercut with which the locking part 12 of the tongue 10 can cooperate.

Figure 17:
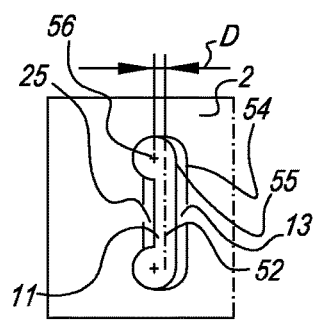
FIGS. 17 and 18, in a view on the area indicated by F17 in FIG. 16, represent still other variants of groove profiles.

FIG. 17 represents an example, wherein the milling cutter 51 has entered on one side of the groove profile 25 and has exited it on the other side, and wherein on both sides an eccentric entering/exiting has been applied.

Figure 18:
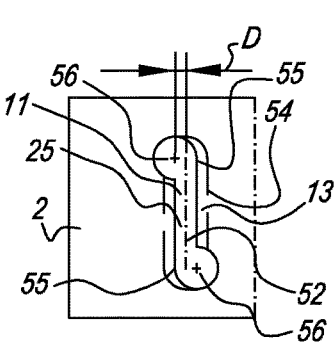

FIG. 18 represents another embodiment of an eccentric exiting and entering of the milling cutter 51, wherein the points 56 of entering and exiting can be found on opposite sides of the centerline 52.

It is clear that the technique of entering eccentrically can also be applied with groove profiles which are made finite on only one side of this profile, and wherein the other side of the groove profile coincides with a side of the element to be milled, or wherein the groove profile, in other words, is open at this side, similar to the alternative on FIG. 6 represented in dashed line.

Preferably, the eccentric entering is applied in combination with a method having the characteristics of the tenth aspect. According to a variant, it is not necessary that the basic panel is transported along a processing station by means of a pass-through system. Such eccentric entering can be performed by means of any device with at least one milling cutter.

Generally, the technique of entering eccentrically can be applied for realizing groove profiles 25, which are finite on one side or on two sides, in panel elements. These panel elements do not necessarily have to form the walls of a drawer 1, however, may also form part of a composed element, such as a cupboard, desk, table or the like.

Figure 19:
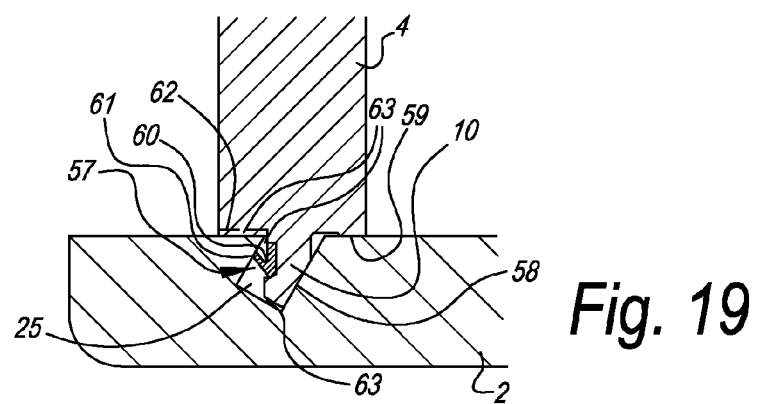
FIG. 19, in a view similar to that of FIG. 7, illustrates another particular embodiment of cooperating profiles.

FIG. 19 represents another tongue and groove connection, which can be applied within the scope of, for example, the ninth aspect of the invention, however, in general can be applied as a corner connection in any composed element. The particularity here is that the connection, in this case the tongue 10, is provided with a flexible material or with a flexible element 57. Such element 57 is provided in order to counteract any possible play in the tongue-groove-connection. In a coupled condition, the flexible element 57 presses tongue parts, in this case the tongue parts made in one piece with the panel or sidewall 4, against reference surfaces 58-59 of the groove profile 25, as a result of which an acceptable mutual positioning among the connected walls 2-4 can be achieved. Such connection can show less or no play in comparison to a traditional tongue-in-groove-connection.

Preferably, a first reference surface 58 of said reference surfaces 58-59 is formed internally in the groove profile 25. Preferably, a second reference surface 59 of said reference surfaces 58-59 is formed on the surface of the wall 2 with the groove profile 52. Such arrangement of the reference surfaces is illustrated by means of FIG. 19. It is clear that the reference surfaces 58-59 in general preferably extend transverse in mutual respect.

Said flexible element 57 can be manufactured, for example, of one or more synthetic materials, such as polyethylene, polyvinyl chloride, polypropylene and the like, for example, by means of an extrusion, coextrusion or injection molding technique.

Here, the flexible element is provided with a lip 61 which is rotatable around a hinge 61, said lip cooperating with the groove profile 25 for obtaining said pressing on. Of course, other mechanisms are not excluded. Preferably, a snap effect is applied, such as here, wherein during the coupling of the walls 2-4 a to-and-fro movement of the flexible element 57 or a part thereof is obtained. Use can also be made of elastic compression, followed by relaxation of a flexible material.

According to a variant, instead of a flexible element 57 also an element, whether or not rigid, can be used, which, for example like a wedge, is driven into an opening between the tongue and the groove, whether or not automatic, in order to obtain said pressing-on against the reference surfaces 58-59.

FIG. 19 represents in dashed line 62 that preferably a space 63 is applied between the surfaces of tongue and groove which do not form part of the reference surfaces 58-59.

Although the flexible element 57 or flexible material here is illustrated at the tongue 10, it is also possible that it is situated in the groove 11.

Figure 20:
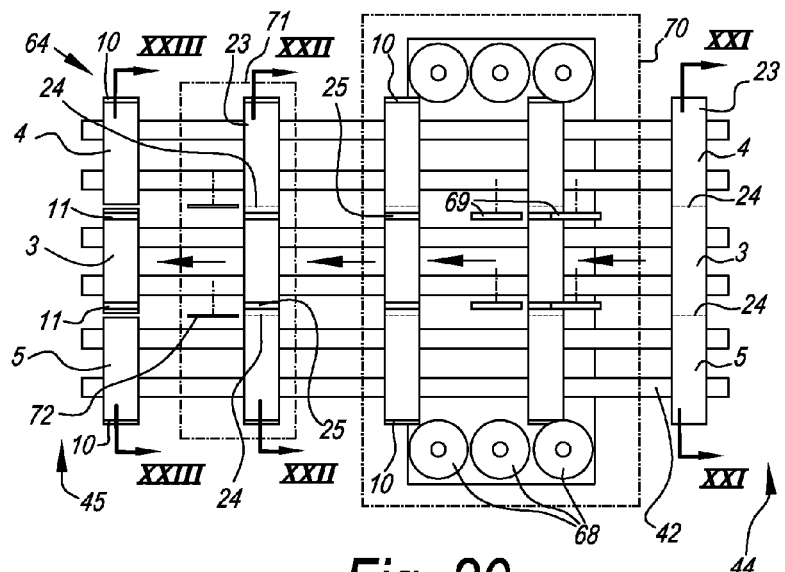
FIG. 20 represents a method for manufacturing drawers with, amongst others, the characteristics of the eleventh aspect.

FIG. 20 schematically represents an example of a device 64 applying the method of the eleventh aspect.

FIG. 21 represents that for manufacturing drawers 1 according to the eleventh aspect, it will be started from a larger panel or board 23, from which at least two walls 3-4 are obtained. In this case, three walls 2-4-5 are obtained from the respective panel or board 23, namely two sidewalls 3-5 and a rear wall 4. The respective final walls 3-4-5 are situated in each other's prolongation in the larger panel or the board 23. In dashed line 24, the separation between the respective walls 3-4-5 is represented, such as it will be obtained after subdividing. In this case, the larger panel or the board 23 comprises a core material 65, such as a MDF or HDF panel or a panel of wood particle board, with a decorative layer 66-67 on both flat sides, such as, for example, a foil or a laminate. Of course, the invention of the eleventh aspect can also be applied with other types of panels, such as with solid wooden panels.

As FIGS. 20 and 22 show, by means of milling tools 68-69 profiles are formed allowing that the finally obtained walls will fit into each other in a locking manner. To this aim, use is made of a tongue 10 and groove 11 with locking parts 12-13, wherein these profiles can be joined together laterally and wherein the respective groove 11 is provided on the interior side of a first wall 3, namely, in this case on the interior side of the final rear wall 3, whereas the respective edge 10 is provided on the narrow end 19 of a second wall 4, namely in this case on one of the narrow ends 19 of both final sidewalls 4-5. For forming the tongue 10, the milling tools 68 engage on both short sides of the larger panel or the board 23; for forming the groove 11 or the groove profile 25, the milling tools 69, for example, such as here, can engage on one of the flat sides of the larger panel or the board 23.

For forming the tongue 10, use is made of a pass-through milling machine 70, wherein the larger panel or the board 23 is moved with its short edges over at least two and in this case three milling tools 68. It is known as such, for example, from WO 97/47834, to form locking profiles at the edge of a panel by means of at least two rotating milling tools. To this aim, preferably two rotating milling tools are applied, which are arranged at a different angle in respect to the panel.

For forming the groove 11 or the groove profile 25, the device 64 of FIG. 20, per groove 11 to be milled, comprises at least two additional rotating milling tools 69. In the example, these are arranged in the pass-through milling machine 70.

FIGS. 20 to 22 clearly show that said rear wall 3 and both sidewalls 4-5 are manufactured from one and the same board 23 and that herein the respective groove 11 and the respective tongue 10 are formed by means of a treatment, in this case consisting of a plurality of partial treatments, namely a plurality of milling treatments, performed on said larger panel or board 23. Only after this the respective panel 23 or the larger panel are subdivided into the respective walls 3-4-5 by means of a dividing device 71, such as a sawing device with one or more rotating saw blades 72.

FIG. 23 represents the obtained walls 3-4-5. FIG. 24 represents that, for example, the sidewalls 3-5 can also be post-treated for realizing connection means 9 other than locking profiles, or a portion of such connection means 9. In the example, to this aim also bores 17 are performed for providing dowels or other connection elements 15 therein. FIG. 25 represents that, for example, the rear wall 3 can be provided with an edge finishing, for example, such as here in the form of a glue-on masking strip 73 or ABS strip.

Figure 26:
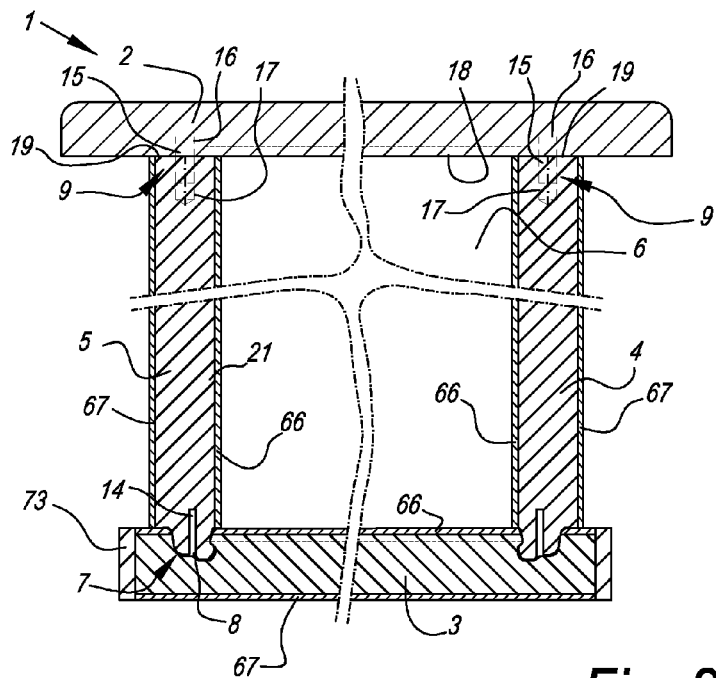
FIG. 26 represents a drawer which is obtained according to the method illustrated in FIG. 20.

FIG. 26 represents the assembly or the drawer 1 which can be obtained on the basis of the respective sidewalls 4-5 and rear wall 3. To this aim, additionally a front panel or front wall 2 is attached to the narrow end faces 19 of the sidewalls 4-5, by means of the aforementioned dowels, and a drawer bottom 6 is inserted into grooves 21 provided for this purpose in the respective walls 2-3-4-5. Such grooves can be provided in the walls 2-3-4-5 in a similar manner as illustrated in FIG. 20. Such processing station 49 is not represented here, however, can be arranged downstream in the device of FIG. 20 in the same manner as illustrated in FIG. 12.

The embodiment represented in FIG. 26 also shows the characteristics of the first aspect mentioned in the introduction. It is clear that any locking profiles can be applied, which preferably can be inserted laterally. Thus, for example, possibly the gap 14 can be omitted from the tongues 10.

It is clear that the method as represented in FIGS. 20 to 24 also shows the characteristics of the tenth aspect mentioned in the introduction.

As aforementioned, it is clear that the invention is intended in particular for wood-based drawers.

The present invention is in no way limited to the embodiments described by way of example and represented in the figures; on the contrary, such drawers and methods for manufacturing drawers can be realized according to various variants without leaving the scope of the invention.

The invention claimed is:

1. A method for manufacturing drawers, wherein the drawers comprise walls and a bottom, wherein said walls comprise at least a front wall, rear wall and two sidewalls, the method comprising:

forming first walls from a plurality of boards; and forming second walls from said plurality of boards, wherein, one of said first walls and one of said second walls are both formed from a single one of said plurality of boards;

wherein said boards have a length direction and a width direction and wherein the one of said first wall and the one of said second wall are formed from said single one of said plurality of boards by portions of said board located at different positions along the length direction;

wherein each of said first walls is formed to comprise a first cooperating profile extending in said width direction, and each of said second walls is formed to comprise a second cooperating profile extending in said width direction, the first cooperating profile of each of said first walls and the second cooperating profile of each of said second walls being formed such that the first cooperating profile of a corresponding one of said first walls extends in a direction parallel to a direction in which the cooperating second profile of a corresponding one of said second walls extends, wherein the first and second cooperating profiles include a tongue and a groove with locking parts, the tongue being formed to fit into the groove in a locking manner, wherein the first and second cooperating profiles are formed to be joined laterally into each other by a movement of the cooperating first profile of the corresponding one of said first walls and the second profile of the corresponding one of said second walls towards each other in a direction that extends in a plane that is perpendicular to the directions in which the cooperating first and second profiles extend; and wherein the respective groove is provided on a plane configured to become an interior side of the corresponding one of said first walls and the respective tongue is provided on the distal end of the corresponding one of said second walls, wherein, for each board of said plurality of boards, the respective groove and the respective tongue are formed by means of a continuous pass-through treatment performed on said plurality of boards, said treatment including a single treatment or a one or more partial treatments with said plurality of boards passing through in a direction transverse to said length direction; and wherein, for each board of said plurality of boards, only after forming at least a portion of said groove and at least a portion of said tongue on said board, said board is subdivided into two or more completely separated walls, said completely separated walls including said one of said first walls and said one of said second walls, wherein the subdividing takes place in the direction transverse to said length direction.

2. The method of claim 1, wherein said treatment is a pass-through treatment.

3. The method of claim 1, wherein said tongue is formed on a distal end of said board.

4. The method of claim 1, wherein said groove is formed in a flat planar side of said board.

5. The method of claim 1, wherein at least three walls are obtained from said board including two sidewalls, and a front wall or a rear wall.

6. The method of claim 1, wherein all locking profiles of the respective walls are formed at least partially or even entirely prior to subdividing said board into the respective walls.

* * * * *